United States Patent
Tudor et al.

(10) Patent No.: US 12,442,194 B2
(45) Date of Patent: Oct. 14, 2025

(54) BUILDING SURFACE PANELS WITH AGED FOAM BACKING AND METHOD OF MANUFACTURE

(71) Applicant: CertainTeed LLC, Malvern, PA (US)

(72) Inventors: Jay M. Tudor, Goodrich, MI (US); David J. Stucky, Grass Lake, MI (US); Ashley A. Schultz, Jackson, MI (US); Eishaan Gakhar, Ann Arbor, MI (US); Dev B. Barpanda, Northville, MI (US)

(73) Assignee: CERTAINTEED LLC, Malvern, PA (US)

( * ) Notice: Subject to any disclaimer, the term of this patent is extended or adjusted under 35 U.S.C. 154(b) by 0 days.

(21) Appl. No.: 17/581,533

(22) Filed: Jan. 21, 2022

(65) Prior Publication Data

US 2024/0110386 A1 Apr. 4, 2024

Related U.S. Application Data

(60) Provisional application No. 63/140,637, filed on Jan. 22, 2021.

(51) Int. Cl.
*E04F 13/00* (2006.01)
*B29C 44/00* (2006.01)
(Continued)

(52) U.S. Cl.
CPC ........ *E04F 13/0876* (2013.01); *B29C 44/354* (2013.01); *B32B 27/065* (2013.01);
(Continued)

(58) Field of Classification Search
CPC .. E04F 13/0876; B32B 27/065; B32B 27/302; B32B 27/304; B32B 2266/0228;
(Continued)

(56) References Cited

U.S. PATENT DOCUMENTS 876,098 A * 1/1908 Savery ............... E04F 13/12
52/555
3,183,530 A * 5/1965 Girden ............... B63C 9/08
441/88
(Continued)

FOREIGN PATENT DOCUMENTS

GB 2452756 A * 3/2009 ......... A41D 13/0125
WO 2012058177 A1 5/2012

OTHER PUBLICATIONS

Amanda Ringler; What is Foam Board Insulation? How it Works and What it is Made of; 6 pages; Aug. 20, 2018. (Year: 2018).*
(Continued)

*Primary Examiner* — Linda L Gray
(74) *Attorney, Agent, or Firm* — Abel Schillinger, LLP; Stephen Eland

(57) ABSTRACT

The present disclosure relates generally to cladding for covering a building surface. The present disclosure relates more particularly a method of manufacturing a building surface panel. The method includes providing a foam piece having a 30 day/23° C. residual shrinkage of no more than 0.2%. The foam piece having the 30 day/23° C. residual shrinkage of no more than 0.2% is attached to a rear side of an outer shell so as to form the building surface panel. In some embodiments, a front side of the outer shell forms a visible surface of the building surface panel. The foam piece can be provided, e.g., by aging the foam piece for a time and at a temperature such that the 30 day/23° C. residual shrinkage is no more than 0.2%. The foam piece to be aged can, in some embodiments, be cut from a body of foam.

37 Claims, 12 Drawing Sheets

(51) Int. Cl.
   *B29C 44/34*   (2006.01)
   *B32B 27/00*   (2006.01)
   *B32B 27/06*   (2006.01)
   *B32B 27/30*   (2006.01)
   *B32B 37/12*   (2006.01)
   *B32B 38/00*   (2006.01)
   *E04F 13/08*   (2006.01)

(52) U.S. Cl.
   CPC .......... *B32B 27/302* (2013.01); *B32B 27/304* (2013.01); *B32B 37/12* (2013.01); *B32B 38/0004* (2013.01); *B32B 2038/0084* (2013.01); *B32B 2266/0228* (2013.01); *B32B 2305/022* (2013.01); *B32B 2307/558* (2013.01); *B32B 2307/734* (2013.01); *B32B 2309/025* (2013.01); *B32B 2327/06* (2013.01); *B32B 2355/00* (2013.01); *B32B 2419/00* (2013.01); *B32B 2607/00* (2013.01)

(58) Field of Classification Search
   CPC .......... B32B 2305/022; B32B 2419/00; B32B 2607/00; B29C 44/354
   See application file for complete search history.

(56) References Cited

U.S. PATENT DOCUMENTS

| | | | | |
|---|---|---|---|---|
| 3,231,439 | A * | 1/1966 | Voelker | B32B 27/00 |
| | | | | 264/DIG. 13 |
| 3,738,895 | A * | 6/1973 | Paymal | B29C 70/003 |
| | | | | 264/45.3 |
| 3,960,792 | A | 6/1976 | Nakamura | |
| 4,102,720 | A * | 7/1978 | Kaneko | B32B 38/06 |
| | | | | 156/244.11 |
| 4,122,203 | A * | 10/1978 | Stahl | E04B 1/94 |
| | | | | 264/46.7 |
| 4,129,530 | A * | 12/1978 | Park | C08J 9/147 |
| | | | | 521/149 |
| 5,247,770 | A | 9/1993 | Ting | |
| 5,489,407 | A | 2/1996 | Suh et al. | |
| 5,589,519 | A * | 12/1996 | Knaus | C08J 9/04 |
| | | | | 521/184 |
| 8,061,097 | B2 | 11/2011 | Holt | |
| 8,225,573 | B2 | 7/2012 | Wilson | |
| 2001/0041256 | A1 | 11/2001 | Heilmayr | |
| 2005/0153122 | A1 | 7/2005 | Detterman | |
| 2007/0078191 | A1 | 4/2007 | Guhde | |
| 2007/0175154 | A1 | 8/2007 | Wilson | |
| 2007/0193177 | A1 | 8/2007 | Wilson | |
| 2010/0064616 | A1 | 3/2010 | Culpepper | |
| 2010/0132289 | A1 | 6/2010 | Mahaffey | |
| 2010/0178458 | A1 * | 7/2010 | Coppock | B29C 44/326 |
| | | | | 428/138 |
| 2011/0154759 | A1 | 6/2011 | Wilson | |
| 2012/0096790 | A1 | 4/2012 | Wilson | |
| 2013/0055669 | A1 | 3/2013 | Olszewski et al. | |
| 2015/0000220 | A1 | 1/2015 | Culpepper | |
| 2016/0047128 | A1 | 2/2016 | Yoder | |
| 2018/0002932 | A1 | 1/2018 | Van Giel | |
| 2018/0202167 | A1 | 7/2018 | Culpepper | |
| 2019/0234077 | A1 | 8/2019 | Culpepper | |
| 2021/0115673 | A1 | 4/2021 | Culpepper | |
| 2021/0246254 | A1 | 8/2021 | Bindschendler et al. | |
| 2024/0141654 | A1 | 5/2024 | Tudor et al. | |

OTHER PUBLICATIONS

Research Begins Here; 4 pages; Nov. 2007. (Year: 2007).*

English machine translation of WO 2015083607 A1; Jun. 11, 2015; Konishi; 47 pages; A62B17/003. (Year: 2015).*

C. Ghafafian, "Shrinkage Behavior of Polystyrene-based Foam Molded Parts Depending on Volatile Matter Content and Other Factors," Masters Thesis, University of California Irvine (2016).

* cited by examiner

BUILDING SURFACE PANELS WITH AGED FOAM BACKING AND METHOD OF MANUFACTURE

CROSS-REFERENCE TO RELATED APPLICATIONS

This application claims the benefit of priority of U.S. Provisional Patent Application No. 63/140,637, which is hereby incorporated herein by reference in its entirety.

BACKGROUND OF THE DISCLOSURE

1. Field of the Disclosure

The present disclosure relates generally to a cladding for covering a building surface. The present disclosure relates more particularly to foam backed building surface panels configured to form a visible surface over a support structure.

BACKGROUND OF THE DISCLOSURE

1. Field of the Disclosure

The present disclosure relates generally to a cladding for covering a building surface. The present disclosure relates more particularly to foam backed building surface panels configured to form a visible surface over a support structure.

2. Technical Background

Building surface panels, such as cladding or siding, are visible elements that cover an underlying support structure. Siding panels are typically used in the construction of homes, businesses, and other buildings on exterior walls. The siding panels can provide protection to the underlying support structure from weather and other elements.

There is a wide variety of different types of building surface panels that may be used to cover exterior walls. On variety that is growing in popularity is foam-backed siding panels. These panels typically include an outer shell of a first material that forms the visible surface of the building surface panel and a layer of foam provided behind the outer shell. In some cases, the foam can provide a layer of insulation behind the shell, which enhances the insulating performance of the building surface panel. Moreover, in some instances, the foam can provide a structural support to help maintain the shape of the shell. In some cases, the added structural support provided by the foam can allow the building surface panels to be manufactured in greater widths or lengths without sacrificing the performance of the panel.

While foam-backed building surface panels can demonstrate excellent performance and provide several advantages, many foam-backed building surface panels form a dimple where two neighboring panels meet and overlap. The present inventors have determined that the formation of a dimple at the edges of foam-backed building surface panels discourages builders and customers from using such panels. Accordingly, the present inventors have determined that identifying the source of the dimple and eliminating this effect would be advantageous.

SUMMARY OF THE DISCLOSURE

In one aspect, the present disclosure provides a method of manufacturing a building surface panel, the method comprising:
  providing a foam piece having a 30 day/23° C. residual shrinkage of no more than 0.2%; and
  attaching the foam piece having the 30 day/23° C. residual shrinkage of no more than 0.2% to a rear side of an outer shell so as to form the building surface panel, e.g., wherein a front side of the outer shell forms a visible surface of the building surface panel.

The foam piece can be provided, e.g., by aging the foam piece for a time and at a temperature such that the 30 day/23° C. residual shrinkage is no more than 0.2%. The foam piece to be aged can, in some embodiments, be cut from a body of foam.

In another aspect, the present disclosure provides a method of manufacturing a building surface panel, the method comprising:
  providing a foam piece having a 150 day/23° C. residual shrinkage of no more than 0.25%; and
  attaching the foam piece having the 150 day/23° C. residual shrinkage of no more than 0.25% to a rear side of an outer shell so as to form the building surface panel, e.g., wherein a front side of the outer shell forms a visible surface of the building surface panel.

The foam piece can be provided, e.g., by aging the foam piece for a time and at a temperature such that the 150 day/23° C. residual shrinkage is no more than 0.25%. The foam piece to be aged can, in some embodiments, be cut from a body of foam.

In another aspect, the present disclosure provides a method of manufacturing a building surface panel, the method comprising:
  providing a foam piece (e.g., by cutting a foam piece from a body of foam);
  aging the foam piece for a time and at a temperature such that a ratio of the shrinkage during the aging to a 30 day/23° C. initial shrinkage of the foam piece is at least 0.5; and
  attaching the aged foam piece to a rear side of an outer shell so as to form the building surface panel, wherein a front side of the outer shell forms a visible surface of the building surface panel.

In another aspect, the present disclosure provides a method of manufacturing a building surface panel, the method comprising:
  providing a foam piece (e.g., by cutting a foam piece from a body of foam);
  aging the foam piece for a time and at a temperature such that a ratio of the shrinkage during the aging to a 150 day/23° C. initial shrinkage of the foam piece is at least 0.5; and
  attaching the aged foam piece to a rear side of an outer shell so as to form the building surface panel, e.g., wherein a front side of the outer shell forms a visible surface of the building surface panel.

In another aspect, the present disclosure provides a method of manufacturing a building surface panel, the method comprising:
  providing a foam piece (e.g., by cutting a foam piece from a body of foam);
  aging the foam piece for at least five days so as to form an aged foam piece; and
  attaching the aged foam piece to a rear side of an outer shell so as to form the building surface panel, e.g., wherein a front side of the outer shell forms a visible surface of the building surface panel.

In another aspect, the present disclosure provides a method of manufacturing a building surface panel, the method comprising:

providing a foam piece (e.g., by cutting a foam piece from a body of foam);

aging the foam piece at a temperature of at least 30° C. so as to form an aged foam piece; and attaching the aged foam piece to a rear side of an outer shell so as to form the building surface panel, e.g., wherein a front side of the outer shell forms a visible surface of the building surface panel.

In another aspect, the disclosure provides a building surface panel comprising:

an outer shell having a front side and a rear side; and a foam piece including a front surface and a rear surface, the front surface of the foam piece being attached to the rear side of outer shell along a length of the building surface panel so as to form a layered structure that extends along the length of the building surface panel, wherein the building surface panel exhibits a deflection measurement of no more than 0.4 inches if subjected to a curvature test, the curvature test comprising:

removing a substantially flat strip of the layered structure from the building surface panel, the strip extending parallel to the length of the building surface panel and having a length of 33 inches and a width of 4.5 inches, defining a first end point of the strip at a position on the front side of the outer shell that is 1.5 inches from a first end of the strip and centered across the width of the strip, and defining a second end point of the strip at a position on the front side of the outer shell that is that is 1.5 inches from the second end of the strip and centered across the width of the strip, positioning the strip such that the width is oriented vertically, the front side of the outer shell faces a fixed reference plane, and a line that passes through the first and second end points is parallel to the reference plane, and measuring, using a laser position gage, the deflection measurement as equal to a difference between a first distance from the end points to the reference plane and a second distance from a peak on the front side of the outer shell to the reference plane.

In another aspect, the disclosure provides a building surface panel comprising:

an outer shell having a front side and a rear side; and a foam piece including a front surface and a rear surface, the front surface of the foam piece being attached to the rear side of outer shell along a length of the building surface panel so as to form a layered structure that extends along the length of the building surface panel, wherein the building surface panel exhibits a deflection measurement of no more than 0.4 inches if subjected to a curvature test, the curvature test comprising:

removing a substantially flat strip of the layered structure from the building surface panel, the strip extending parallel to the length of the building surface panel and having a length of 33 inches and a width of 3 inches, defining a first end point of the strip at a position on the front side of the outer shell that is 1.5 inches from a first end of the strip and centered across the width of the strip, and defining a second end point of the strip at a position on the front side of the outer shell that is that is 1.5 inches from the second end of the strip and centered across the width of the strip, positioning the strip such that the width is oriented vertically, the front side of the outer shell faces a fixed reference plane, and a line that passes through the first and second end points is parallel to the reference plane, and measuring, using a laser position gage, the deflection measurement as equal to a difference between a first distance from the end points to the reference plane and a second distance from a peak on the front side of the outer shell to the reference plane.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that conventional polymer foam-backed building surface panels may form a dimple at the end of the panel near a joint with a neighboring panel. Accordingly, the present inventors have examined such panels to determine the source of this dimple and have developed methods to substantially reduce the formation of the dimple.

Figure 1:
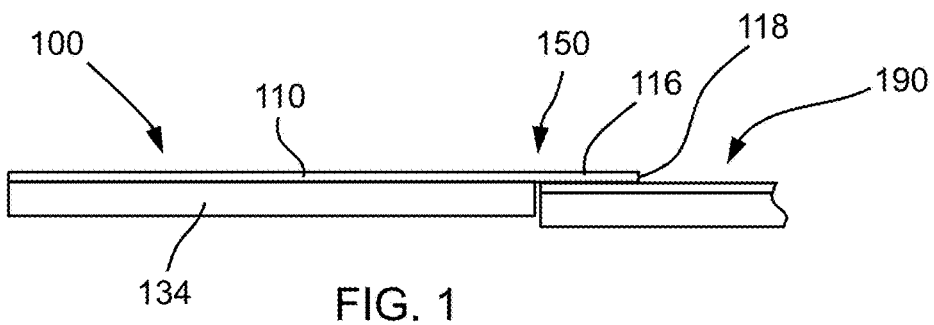
FIG. 1 is a schematic depiction of a theoretical overlapping joint between two foam backed building surface panels.

The present inventors have determined that a dimple may form at a joint between two lapping building surface panels when either or both of the building surface panels have even a slight curvature. FIG. 1 schematically depicts an overlapping joint 150 between a first building surface panel 100 and a second building surface panel 190. To form the joint 150 and avoid a gap between the two building surface panels 100, 190, the outer shell 110 of the first building surface panel 100 extends past the end of the foam backing 134. This provides an overlapping portion 116 of the outer shell 110 of the first building surface panel 100 that may overlap the second building surface panel 190 in order to form a continuous exterior surface. If the two building surface panels 100, 190 were substantially flat, as in FIG. 1, the outer shell of both panels are parallel and reflect light similarly, even under grazing lighting conditions. Thus, while the edge 118 of the outer shell 110 of the first building surface 100 may be visible as a thin line, shading and other lighting variances along the length of the panels across the joint 150 is minimal or absent, which helps obscure the joint 150.

Figure 2:
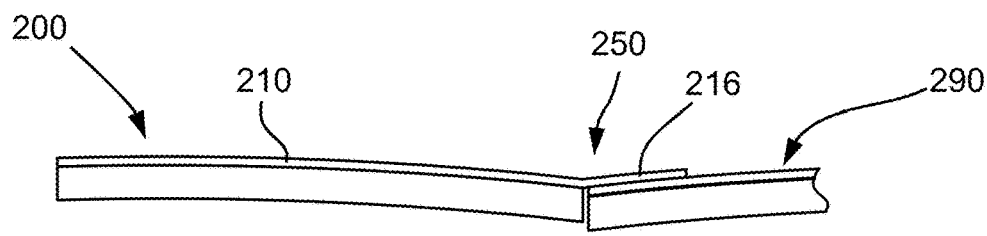
FIG. 2 is a schematic depiction of an actual overlapping joint between two foam backed building surface panels.

In contrast, FIG. 2 schematically depicts an overlapping joint 250 between a first building surface panel 200 and a second building surface panel 290, where both building surface panels 200, 290 have a slight curvature. (The curvatures shown in FIG. 2 are exaggerated for clarity.) As illustrated, the overlapping portion 216 of the outer shell 210 of the first building surface panel 200 that passes over the second building surface panel 290 would naturally extend inward at the end of the first building surface panel 200 due to the curvature of the first building surface panel 200. However, due to its overlap of the second building surface panel 290 and the curvature of the second building surface panel 290, the overlapping portion 216 bends outward, forming an inflection point at the joint 250. This abrupt change in the angle of the outer shell 210 of the first building surface panel 200 can result in shading and other lighting variances that are visible and can undesirably highlight the joint between the two building surface panels 200, 290.

The present inventors have also determined that the curvature in foam-backed building surface panels may be caused by a change in the relative lengths of the outer shell and the polymer foam backing after these layers are attached to one another. Once the outer shell and foam layer are attached to one another, the relative lengths of the two layers begin to change, and the layered structure curves to accommodate the shrinkage of one layer relative to the other. The present inventors have identified that the change in the relative length of the foam backing and outer shell may be caused by shrinking of the foam backing after it is attached to the outer shell.

After their initial expansion during a foaming process, many polymer foam materials shrink a small but measurable amount before reaching their final dimensions. For example, polymer foams that are formed using a blowing agent such as pentane may shrink as the blowing agent diffuses out of the foam material. To address this shrinking, foam manufacturers may age bodies of foam to allow the foam to shrink before cutting the foam bodies and using the cut pieces. However, the present inventors have determined that this aging process is insufficient for shrinking foam pieces that will be attached to an outer shell in a building surface panel.

Figure 3:
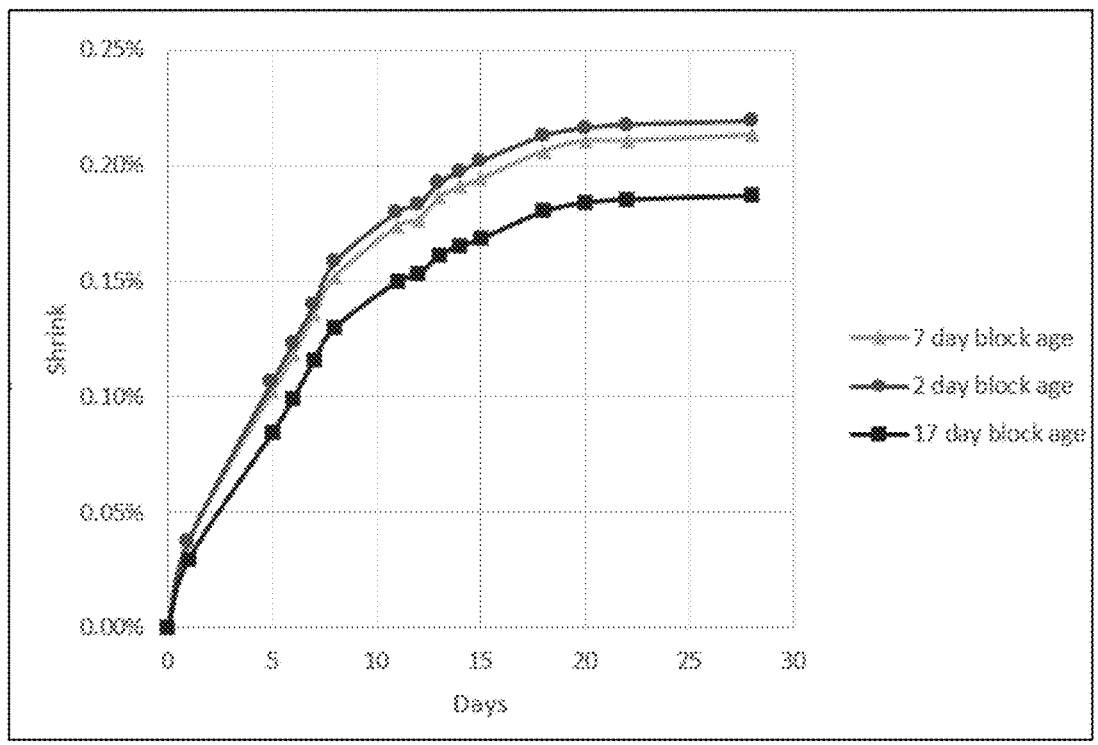
FIG. 3 shows the shrinking of foam pieces cut from bodies of foam that have been aged for various durations.

For example, when investigating the performance of expanded polystyrene (EPS), the present inventors found that foam pieces cut from a foam body continue to shrink even if the foam body was aged for many days. The present inventors have determined that the pentane blowing agent used to expand the polystyrene is retained in the foam body for a long period of time. Accordingly, if pieces of the foam are cut from the body before the foam body has reached its final dimensions, the pieces will continue to shrink after they are cut. For example, FIG. 3 illustrates the change in length over time of three pieces of EPS, which were cut from EPS blocks that were aged for 2 days, 7 days. and 17 days, respectively. As illustrated, while the pieces that are cut from blocks that were aged longer exhibit slightly less shrinking, all of the cut pieces shrunk at least about 0.18% after 25 days. Over the length of a building surface panel this difference can be significant. For example, 0.18% of a 12-foot building surface panel is slightly more than ¼ inch. The present inventors note that this slow shrinkage of the polymer foam is problematic not only for foam pieces cut from larger bodies of foam, but rather is a serious issue for foam pieces made by other methods, e.g., molding and extrusion.

When two pieces of material are attached to one another along their length and one of the two pieces expands or contracts, the change in size will result in a bending stress in the laminated part that will urge the part to curve. Most foam-backed building surface panels have complex shapes that include bent or folded edges. For example, the outer shell of many foam-backed siding panels includes features formed by bent and folded parts of the outer shell material, such as upper and lower locks. The three-dimensional shape of these features will resist bending and may absorb much of the stress in the part caused by the foam shrinkage. However, flatter sections of the building surface panel may form a dimple as a result of this curvature. Moreover, if the three-dimensional components are removed so that the foam piece and outer shell form a simpler layered structure, the bending stress will cause significant curvature in the part.

Figure 4:
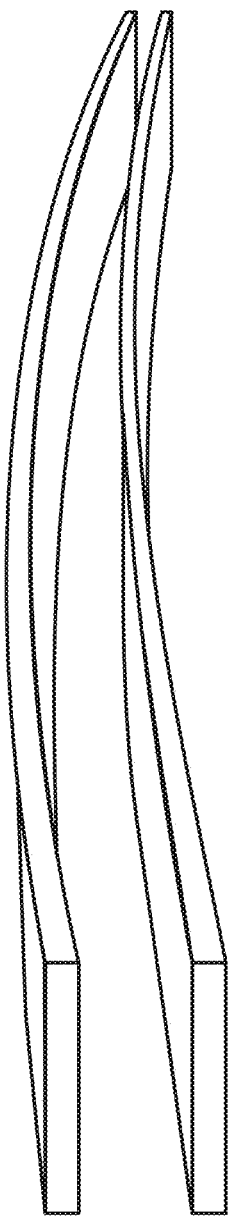
FIG. 4 is an image illustrating the curvature of strips taken from conventional foam-backed building surface panels.

For example, the present inventors discovered that strips cut from foam-backed siding, which include the layered outer shell and foam backing, but exclude the upper and lower locks, curve significantly along their lengths. FIG. 4 shows an image of two such strips cut from a conventional siding product along its length but without the bent portions of the upper and lower locks. As can be seen, the strips curve significantly along their lengths.

The inventors have developed a curvature test to assess the bending stress in foam-backed building surface panels. The curvature test is conducted by initially removing a substantially flat strip of the layered structure from the building surface panel. The cut strip should extend parallel to the length of the building surface panel and have a length of 33 inches and a width of 4.5 inches. The phrase substantially flat portion, as used herein, relates to a section of the building surface panel that excludes areas of the front surface of the outer shall that have a radius of curvature of less than 3 inches, e.g., less than 6 inches, e.g., less than 12 inches. Thus, the substantially flat portion avoids areas of the outer shell that are bent or folded, such as siding locks. Moreover, the cut strip is described as part of the layered structure of the building surface panel in that the entire area of the cut strip includes foam backing covering the outer shell.

First and second end points are then defined on the cut strip, where the first end point of the strip is defined at a position on the front side of the outer shell that is 1.5 inches from a first end of the strip and centered across the width of the strip. Likewise, the second end point of the strip is defined at a position on the front side of the outer shell that is that is 1.5 inches from the second end of the strip and centered across the width of the strip. The cut strip is then laid down on the long cut edge such that the width is oriented vertically. The cut strip is also arranged so that the front side of the outer shell faces a fixed reference plane and a line that passes through the first and second end points is parallel to the reference plane. The curvature test is conducted to determine the deflection in the strip using a laser position gage. The deflection measurement is defined as a difference between a first distance from the end points to the reference plane and a second distance from a peak on the front side of the outer shell to the reference plane. The term peak, as used herein, is the point on the front side of the outer shell that is closest to the fixed reference plane when the cut strip is positioned for the deflection measurement.

Figure 5A:
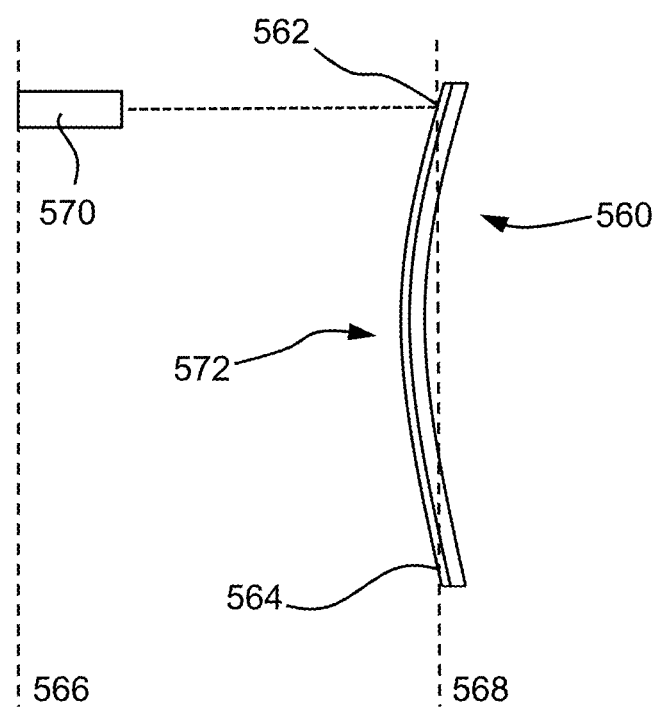
FIG. 5A is a schematic depiction of a method of conducting a curvature test.

FIG. 5A shows a diagram of a top plan view of an embodiment of a cut strip during a curvature test of the disclosure. As explained above, the cut strip 560 is laid down on the long cut edge with the width oriented vertically and the front side 512 of the outer shell 510 of the cut strip 560 facing the fixed reference plane 566. The cut strip 560 is also positioned so that the first end point 562 and second end point 564 fall on a line 568 that is parallel to the fixed reference plane 566. A laser position gage 570 measures the distance of points along the outer shell 510 of the cut strip 560 from the fixed reference plane 566. For example, the laser position gage may measure the distance from the fixed reference plane at every inch along the cut strip 560. The peak 572 is then defined as the measured point closest to the fixed reference plane 566, and the deflection measurement is calculated based on the difference between a first distance from the end points to the reference plane and a second distance from the peak to the reference plane.

Figure 5B:
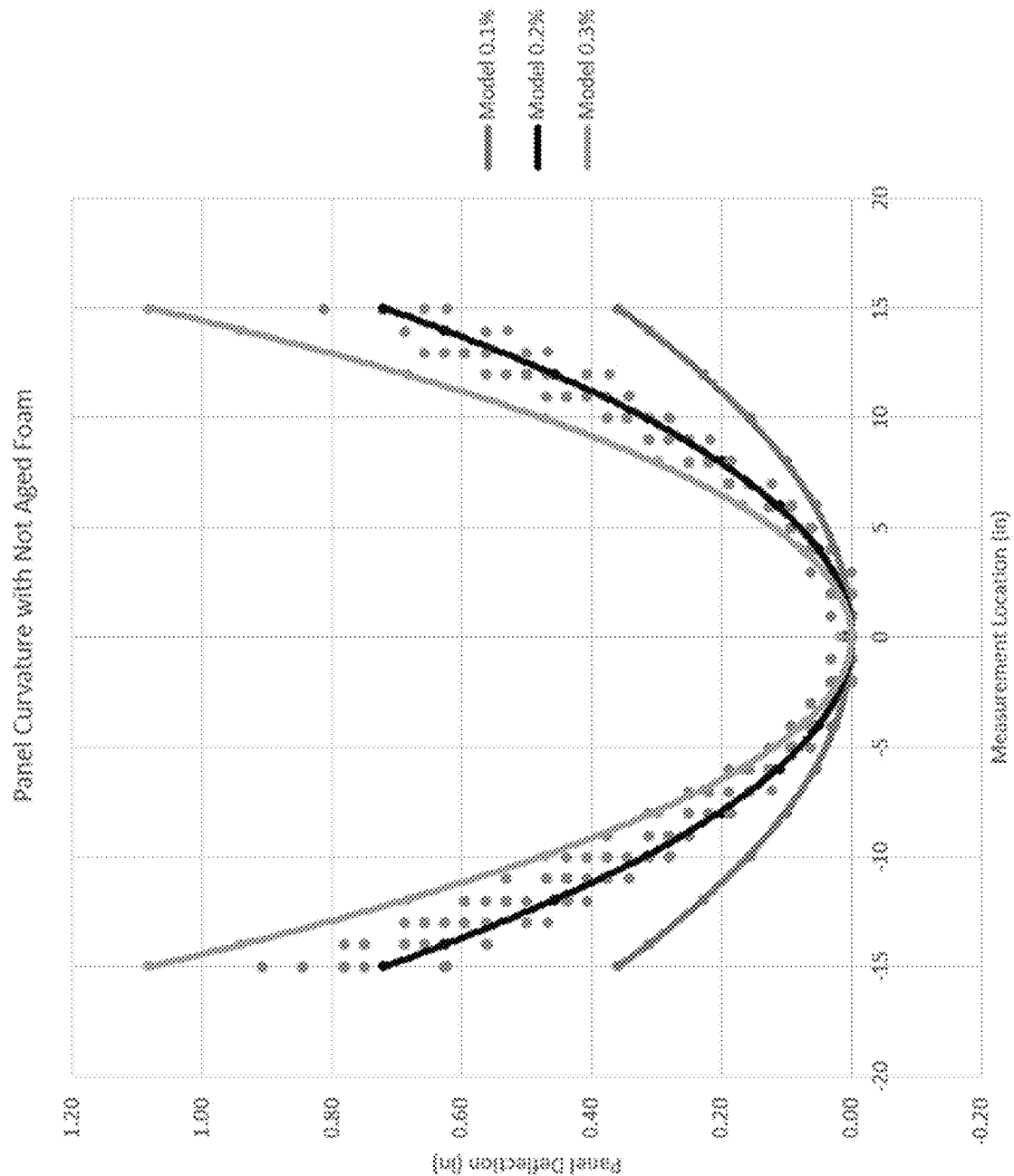
FIG. 5B shows the deflection across strips cut from conventional foam-backed building surface panels.

FIG. 5B shows deflection measurements according to the above-described curvature test taken from eight samples of conventional siding panels. The first and second end points of the cut strip samples are respectively identified at −15 and 15 inches with the peak of each cut strip positioned at 0 inches. Further, the first and second end points are each located 1.5 inches from the respective ends of the 33-inch cut strip. The data in FIG. 5B show that the deflection measurement of the eight conventional siding panels are in a range from about 0.7 inches to about 0.9 inches. FIG. 5B also shows data from models of strips of a layered structure representative of a building surface panel. The data for the models was computed using a finite element analysis tool. The models are represented by solid lines and depict calculated deflection points for cut strips where the foam backing shrinks by 0.1, 0.2 and 0.3 percentage, respectively, where the 0.1% shrinkage corresponds to the lowest deflection measurements and the 0.3% shrinkage corresponds to the highest deflection measurements.

The present inventors have determined that the bending stress in a building surface panel exhibited by the foregoing curvature test can be substantially reduced by aging the foam pieces before they are attached to the outer shell. Accordingly, one aspect of the disclosure is a method of forming a foam-backed building surface panel. The method includes providing a foam piece having a 30 day/23° C. residual shrinkage of no more than 0.1%. The foam piece having the 30 day/23° C. residual shrinkage of no more than 0.2% is attached to a rear side of an outer shell to form the building surface panel. The outer shell is arranged so that a front side of the outer shell forms a visible surface of the building surface panel, and the foam piece forms a foam backing for the outer shell.

As used herein, a "30 day/23° C. residual shrinkage" is measured by determining the percent shrinkage in length (i.e., of the longest dimension) of the foam piece after an additional 30 days of aging at 23° C. in ambient conditions. And a "150 day/23° C. residual shrinkage" is measured by determining the percent shrinkage in length (i.e., of the longest dimension) of the foam piece after an additional 150 days of aging at 23° C. in ambient conditions. Each is a measure of how much the foam piece would shrink after being attached to the outer shell. Accordingly, these values are measured with respect to the state of the foam piece at the time it is attached to the outer shell defining day 0 of the test. These values are a measure of how much the foam piece would shrink before reaching a state of being completely shrunk. The 30 and 150 day values provide reasonable estimates, as shrinkage is nearly asymptotically approaching its ultimate value after 30 days and especially after 150 days.

As described in detail below, the present inventors have determined that bowing and dimpling of a siding panel can be greatly reduced when the 30 day/23° C. residual shrinkage is no more than 0.2%. The present inventors describe herein a number of ways to provide a foam piece with no more than 0.2% 30 day/23° C. residual shrinkage, e.g., by aging. The person of ordinary skill in the art will appreciate that the 30-day 23 C residual shrinkage cannot be measured on a piece of foam that is itself attached to an outer shell. The person of ordinary skill in the art will instead measure 30 day/23° C. residual shrinkage of an otherwise identically formed and treated foam piece, to determine what the 30 day/23° C. residual shrinkage of the foam piece attached to the outer shell would have been at the time it was attached to the outer shell.

Thus one aspect of the disclosure is a method of manufacturing a building surface panel. The method includes providing a foam piece having a 30 day/23° C. residual shrinkage of no more than 0.2%; attaching the foam piece having the 30 day/23° C. residual shrinkage of no more than 0.2% to a rear side of an outer shell so as to form the building surface panel. In various embodiments, a front side of the outer shell forms a visible surface of the building surface panel. As described in more detail below, the foam piece can be provided in some embodiments by aging the foam piece for a time and at a temperature such that the 30 day/23° C. residual shrinkage is no more than 0.2% (or any other value described herein). The foam piece to be aged can be, in some embodiments, cut from a body of foam.

In various embodiments as otherwise described herein, the 30 day/23° C. residual shrinkage of the foam piece is no more than 0.15%, e.g., no more than 0.1%. In various embodiments as otherwise described herein, the 30 day/23° C. residual shrinkage of the foam piece is no more than 0.05%, e.g., no more than 0.03%, or no more than 0.02%.

For example, in various embodiments, the 30 day/23° C. residual shrinkage of the foam piece is in the range of 0.001%-0.2%, e.g., 0.001%-0.15%, or 0.001%-0.1%, or 0.001%-0.05%, or 0.001%-0.03%, or 0.001%-0.02%, or 0.005%-0.2%, or 0.005%-0.15%, or 0.005%-0.1%, or 0.005%-0.05%, or 0.005%-0.03%, or 0.005%-0.02%, or 0.008%-0.2%, or 0.008%-0.15%, or 0.008%-0.1%, or 0.008%-0.05%, or 0.008%-0.03%, or 0.008%-0.02%.

Similarly, the present inventors have determined that bowing and dimpling of a siding panel can be greatly reduced when the 150 day/23° C. residual shrinkage is no more than 0.25%. The present inventors describe herein a number of ways to provide a foam piece with no more than 0.25% 150 day/23° C. residual shrinkage, e.g., by aging. As for the 30 day value, the person of ordinary skill in the art will instead measure 150 day/23° C. residual shrinkage of an otherwise identically formed and treated foam piece, to determine what the 150 day/23° C. residual shrinkage of the foam piece attached to the outer shell would have been at the time it was attached to the outer shell.

Thus, in various embodiments as otherwise described herein, a 150 day/23° C. residual shrinkage of the foam piece is no more than 0.25%. For example, another aspect of the disclosure is a method of manufacturing a building surface panel. The method includes providing a foam piece having a 150 day/23° C. residual shrinkage of no more than 0.25%; and attaching the foam piece having the 150 day/23° C. residual shrinkage of no more than 0.25% to a rear side of an outer shell so as to form the building surface panel. In various embodiments, a front side of the outer shell forms a visible surface of the building surface panel. As described in more detail below, the foam piece can be provided in some embodiments by aging the foam piece for a time and at a temperature such that the 150 day/23° C. residual shrinkage is no more than 0.25% (or any other value described herein). The foam piece to be aged can be, in some embodiments, cut from a body of foam.

In various embodiments as otherwise described herein, the 150 day/23° C. residual shrinkage of the foam piece is no more than 0.20%, e.g., no more than 0.15%. In various embodiments as otherwise described herein, the 150 day/23° C. residual shrinkage of the foam piece is no more than 0.10%, e.g., no more than 0.03%, or no more than 0.05%.

For example, in various embodiments, the 150 day/23° C. residual shrinkage of the foam piece is in the range of 0.001%-0.25%, e.g., 0.001%-0.2%, or 0.001%-0.15%, or 0.001%-0.1%, or 0.001%-0.05%, or 0.005%-0.25%, or 0.005%-0.2%, or 0.005%-0.15%, or 0.005%-0.1%, or 0.005%-0.05%, or 0.006%-0.25%, or 0.008%-0.2%, or 0.008%-0.15%, or 0.008%-0.1%, or 0.008%-0.05%, or 0.008%-0.03%, or 0.008%-0.02%.

The present inventors have determined that bowing and dimpling of a siding panel can be greatly reduced when the foam piece is aged such that a substantial fraction of this shrinkage occurs before attachment to the outer shell. In various embodiments as otherwise described herein, a ratio of the shrinkage during the aging to a 30 day/23° C. initial shrinkage of the foam piece is at least 0.5, that is, at least about half of the total shrinkage of the formed piece occurs before it is attached to the outer shell. For example, another aspect of the disclosure is a method for manufacturing a building surface panel, the method comprising: providing a foam piece; aging the foam piece for a time and at a temperature such that a ratio of the shrinkage during the aging to a 30 day/23° C. initial shrinkage of the foam piece is at least 0.5; attaching the aged foam piece to a rear side of an outer shell so as to form the building surface panel. In various such embodiments, a front side of the outer shell forms a visible surface of the building surface panel.

As used herein, a "30 day/23° C. initial shrinkage" is measured by determining the percent shrinkage in length (i.e., of the longest dimension) of an unaged foam piece after 30 days of aging at 23° C. in ambient conditions. It is a measure of how much the foam piece would shrink before reaching a state of being completely shrunk. The 30 day value provides a reasonable estimate, as shrinkage is nearly asymptotically approaching its ultimate value after 30 days.

In various embodiments as otherwise described herein, the ratio of the shrinkage during the aging to a 30 day/23° C. initial shrinkage of the foam piece is at least 0.6, e.g., at least 0.7. In various such embodiments, the ratio of the shrinkage during the aging to a 30 day/23° C. initial shrinkage of the foam piece is at least 0.8, e.g., at least 0.85. In various such embodiments, the ratio of the shrinkage during the aging to a 30 day/23° C. initial shrinkage of the foam piece is at least 0.9, e.g., at least 0.95. Of course, the person of ordinary skill in the art will understand that some low level of residual shrinkage may be acceptable in real-world samples.

As used herein, a "150 day/23° C. initial shrinkage" is measured by determining the percent shrinkage in length (i.e., of the longest dimension) of an unaged foam piece after 150 days of aging at 23° C. in ambient conditions. It is a measure of how much the foam piece would shrink before reaching a state of being completely shrunk. The 150 day value provides a reasonable estimate, as shrinkage is nearly asymptotically approaching its ultimate value after 150 days. The present inventors have determined that bowing and dimpling of a siding panel can be greatly reduced when the foam piece is aged such that a substantial fraction of this shrinkage occurs before attachment to the outer shell.

In various embodiments as otherwise described herein, a ratio of the shrinkage during the aging to a 150 day/23° C. initial shrinkage of the foam piece is at least 0.5, that is, at least about half of the total shrinkage of the formed piece occurs before it is attached to the outer shell. For example, another aspect of the disclosure is a method for manufacturing a building surface panel, the method comprising: providing a foam piece; aging the foam piece for a time and at a temperature such that a ratio of the shrinkage during the aging to a 150 day/23° C. initial shrinkage of the foam piece is at least 0.5; attaching the aged foam piece to a rear side of an outer shell so as to form the building surface panel. In various such embodiments, a front side of the outer shell forms a visible surface of the building surface panel.

In various embodiments as otherwise described herein, the ratio of the shrinkage during the aging to a 150 day/23° C. initial shrinkage of the foam piece is at least 0.6, e.g., at least 0.7. In various such embodiments, the ratio of the shrinkage during the aging to a 150 day/23° C. initial shrinkage of the foam piece is at least 0.8, e.g., at least 0.85. In various such embodiments, the ratio of the shrinkage during the aging to a 150 day/23° C. initial shrinkage of the foam piece is at least 0.9, e.g., at least 0.95. Of course, the person of ordinary skill in the art will understand that some low level of residual shrinkage may be acceptable in real-world samples.

The present inventors have determined a variety of conditions that can be suitable for aging foam pieces. Generally, longer aging times and higher aging temperatures and lower pressures will provide for more shrinkage during aging and thus less residual shrinkage after aging. Of course, the person of ordinary skill in the art will avoid aging conditions that damage the foam, e.g., temperatures high enough to cause the material of the foam to soften and collapse the foam structure. The conditions of aging are not particularly limited, and the person of ordinary skill in the art will, based on the present disclosure, determine appropriate conditions of aging to provide a desired foam piece having a low residual shrinkage.

For example, in various embodiments as otherwise described herein, the foam piece is aged for at least three days. Accordingly, another embodiment of the disclosure is a method of manufacturing a building surface panel, the method comprising:
  providing a foam piece, e.g., by cutting a foam piece from a body of foam;
  aging the foam piece for at least three days so as to form an aged foam piece; and
  attaching the aged foam piece to a rear side of an outer shell so as to form the building surface panel, wherein a front side of the outer shell forms a visible surface of the building surface panel.

The duration of aging (together with other conditions, notably aging temperature) will impact the amount that the foam piece shrinks before it is attached to the outer shell. Using heat or air circulation, as described in more detail below, can reduce the amount of time needed to reach a desired amount of shrinking before the foam piece is attached to the outer shell. In other embodiments, the foam piece may be aged under ambient conditions for an appropriate time to reach the desired dimensions.

Thus, the person of ordinary skill in the art can select a duration of aging, along with other aging parameters, to provide a desired foam piece. For example, in various embodiments as otherwise described herein, the foam piece is aged for at least four days, e.g., at least five days. In various embodiments, the foam piece is aged for at least 7 days, e.g., at least 10 days. In various embodiments, the foam piece is aged for at least 15 days, e.g., at least 20 days.

However, in various embodiments such long aging times may not be necessary, for example, when the aging is performed at a temperature substantially in excess of 23° C. Thus, in various embodiments as otherwise described herein, the foam piece is aged for at least one day, e.g., at least two days.

In various embodiments of the methods as otherwise described herein, the aging is performed at an elevated temperature, i.e., in excess of 23° C. Heating can be provided, e.g., by heating the air (or another gas) in an area in which the aging is performed, or by more directly heating the foam piece, for example, with heat lamps, radiant heaters, blowers, or other energy sources. An elevated temperature can also be provided by refraining from air conditioning an area, e.g., when outside temperatures are significantly warmer than 23° C.

For example, in some embodiments, the aging is performed at a temperature of at least 30° C. (i.e., averaged over the aging time). In various embodiments, the aging is performed at a temperature of at least 35° C. Accordingly, another aspect of the disclosure is a method of manufacturing a building surface panel, the method comprising:
    providing a foam piece;
    aging the foam piece at a temperature of at least 35° C. so as to form an aged foam piece;
    attaching the aged foam piece to a rear side of an outer shell so as to form the building surface panel.
In some embodiments, a front side of the outer shell forms a visible surface of the building surface panel.

In various embodiments as otherwise described herein, the foam piece is aged at a temperature of at least 40° C., e.g., at least 45° C. In various embodiments as otherwise described herein, the foam piece is aged at a temperature of at least 50° C., e.g., at least 55° C., or at least 60° C.

Of course, it can be desirable to avoid temperatures that will damage the foam. For example, in various embodiments as otherwise described herein, a temperature during aging remains no more than a value that is 20° C. less than a glass transition temperature (measured by differential scanning calorimetry) of the foam of the foam piece. In various embodiments as otherwise described herein, a temperature during aging remains no more than the Heat Distortion Temperature (e.g., at least 10° C. less than or at least 20° C. less than a Heat Distortion Temperature of the foam of the foam piece) of the foam of the foam piece, measured as in ASTM D648.

In various embodiments of the methods as otherwise described herein, the aging is performed at a reduced pressure, i.e., below atmospheric pressure. Reduced pressure can be provided, e.g., by pumping, such as with a vacuum pump, or by aspiration by a flow of fluid such as water.

For example, in some embodiments, the aging is performed at a pressure of no more than 0.85 atmospheres (i.e., averaged over the aging time). Accordingly, another aspect of the disclosure is a method of manufacturing a building surface panel, the method comprising:
    providing a foam piece;
    aging the foam piece at a pressure of no more than 0.85 atmospheres so as to form an aged foam piece;
    attaching the aged foam piece to a rear side of an outer shell so as to form the building surface panel.
In some embodiments, a front side of the outer shell forms a visible surface of the building surface panel.

In various embodiments as otherwise described herein, the foam piece is aged at a pressure of no more than 0.8 atmospheres, e.g., no more than 0.7 atmospheres. In various embodiments as otherwise described herein, the foam piece is aged at a pressure of no more than 0.6 atmospheres, e.g., no more than 0.5 atmospheres.

Figure 6A:
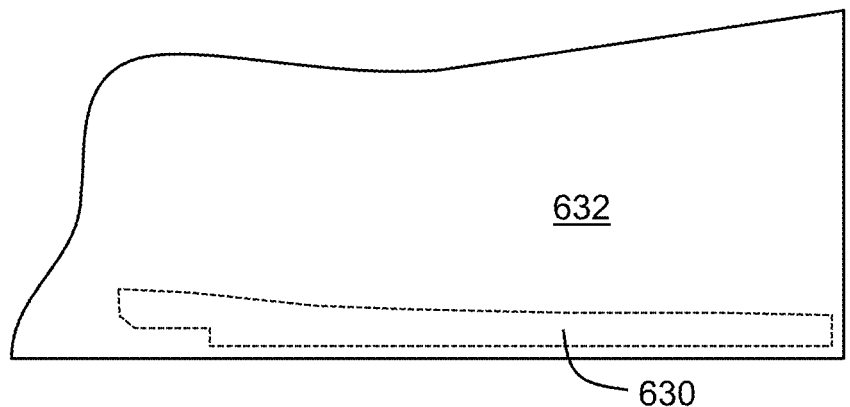
FIGS. 6A-D are a schematic side views showing parts of a method according to an embodiment of the disclosure.

An example of a method according to the disclosure is illustrated in FIGS. 6A-6E. FIG. 6A shows a body of foam 632 with an outline of an end view of a foam piece 630 that is to be cut from the body of foam 632. The body of foam here is in the form of a block. But the person of ordinary skill in the art will appreciate that the body of foam in all embodiments described herein need not be in the form of a block, but rather can take any desirable shape. As an example, in some embodiments, the body of foam is cut using a hot wire cutting method. In other embodiments other cutting techniques are employed, for example using blades, water jets, lasers, abrasive wires, or other cutting mechanisms. The body of foam is significantly larger than the foam piece that is cut therefrom. For example, in some embodiments, the body of foam has a volume of at least 10 times the volume of the foam piece, e.g., at least 100 times the volume of the foam piece, e.g., at least 1000 time the volume of the foam piece. Further, the body of foam is sized and shaped to permit a plurality of foam pieces to be cut therefrom. For example, in some embodiments, the foam piece is one of many foam pieces that are cut from the body of foam. In some embodiments, more than 100 foam pieces are cut from the body of foam. Further, in some embodiments, more than 1000 foam pieces are cut from the body of foam. The terms "body" and "block" of foam, as used herein, are not limited to a particular shape and may be rectangular, cylindrical or another shape.

Figure 6B:
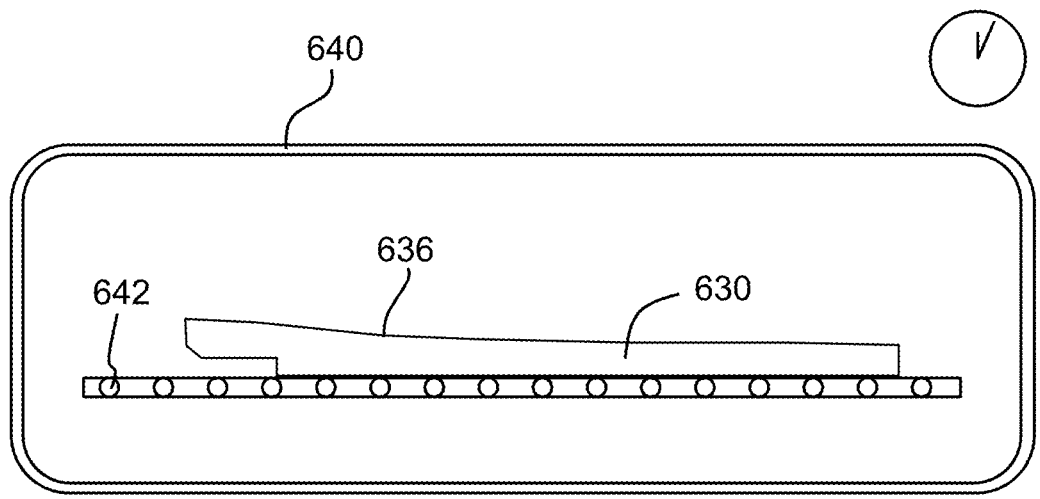
Figure 6C:
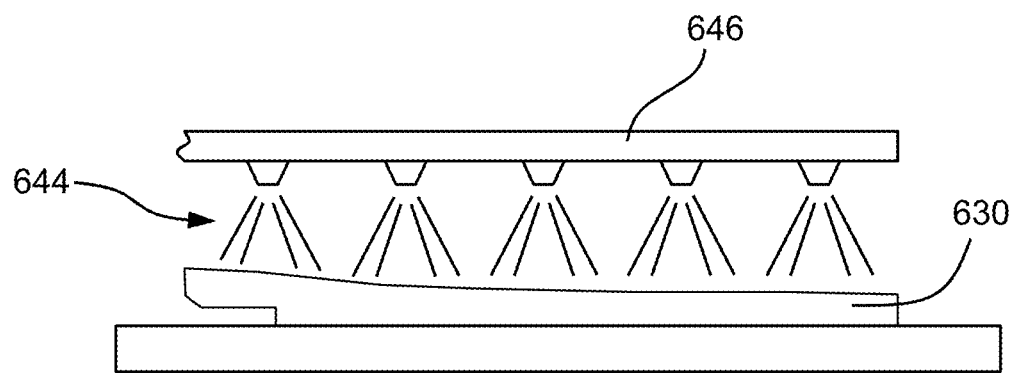
Figure 6D:
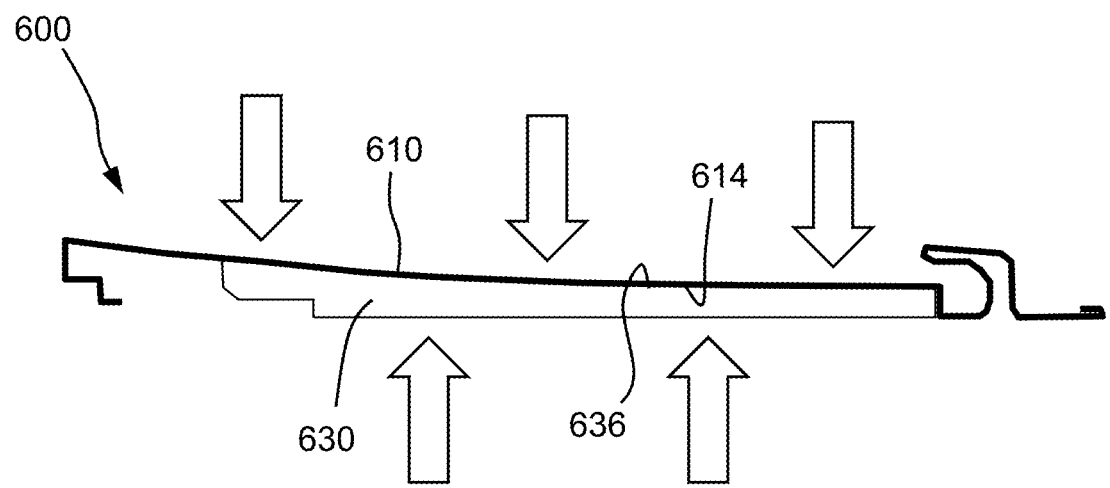

After the foam piece 630 is provided (here, by being cut from the body of foam), it is aged, as shown in FIG. 6B. During the aging process shown in FIG. 6B, the foam piece shrinks to approach its final size. Once the foam piece 630 has been aged, the aged foam piece 630 is attached to the rear side 614 of an outer shell 610, as shown in FIGS. 6C and 6D. The aged foam piece then forms a foam backing 634 of the building surface panel 600, which is shown in perspective view in FIG. 6E.

Figure 6E:
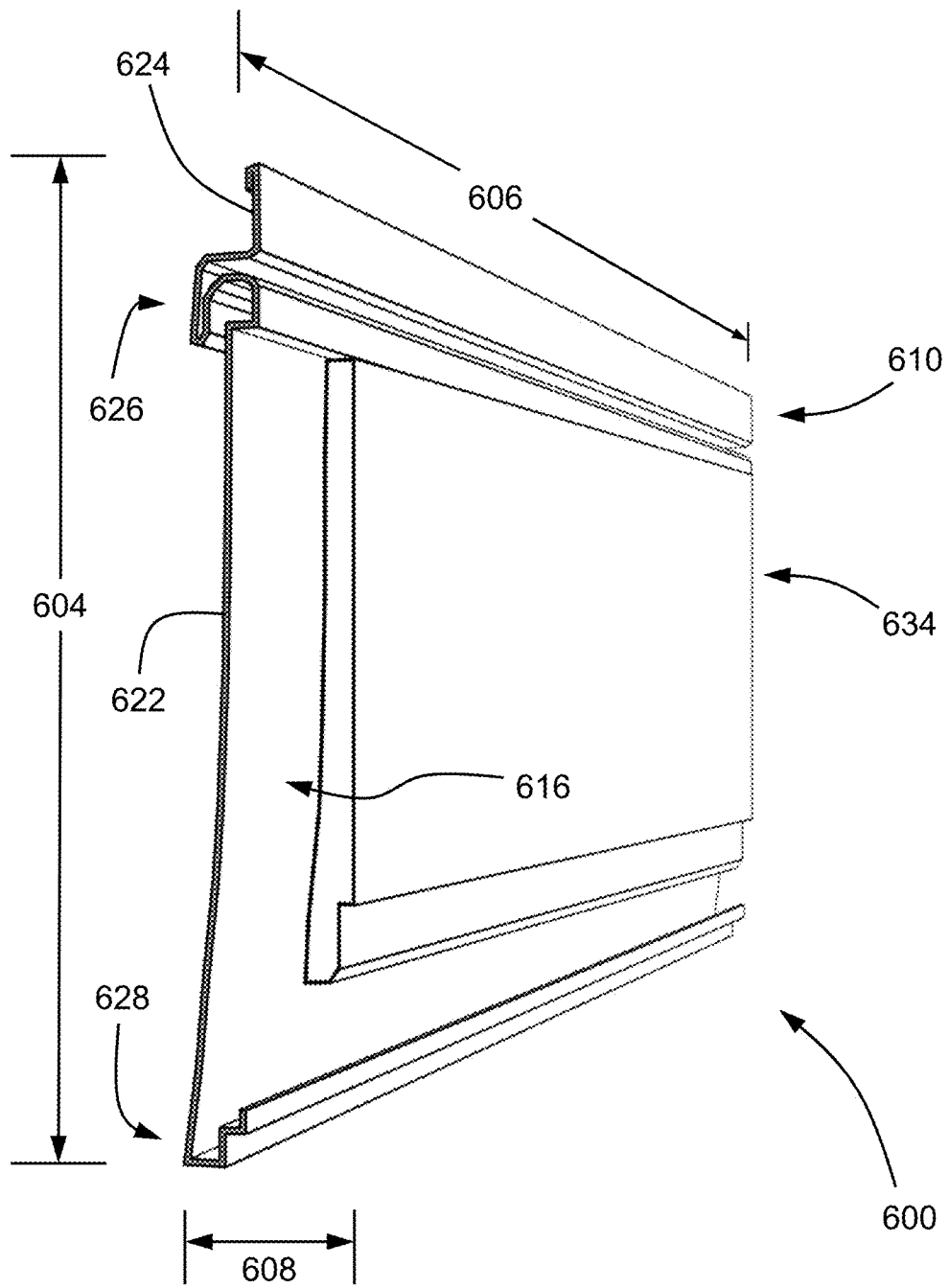
FIG. 6E is a schematic perspective view of a building surface panel according to an embodiment of the disclosure.

In various embodiments of the method as otherwise described herein, the building surface panel is a siding panel. For example, building surface panel 600 formed in the method shown in FIGS. 6A-6D and shown in FIG. 6E is a siding panel that is configured to interlock with other siding panels, as set forth below, and cover the exterior surface of a house or other building. In other embodiments the building surface panel is a siding accessory, such as a siding trim panel. In other embodiments, the building surface panel is another building product, such as soffit or a roofing panel. Other types of panels are also possible.

In various embodiments of the method as otherwise described herein, the outer shell is formed of a polymer material. For example, in some embodiments the outer shell is formed of a material including a polymer matrix that characterizes the performance of the outer shell and is mixed with one or more other components, such as fillers, reinforcing fibers, or additives.

In various embodiments of the method as otherwise described herein, the polymer material includes polyvinyl chloride (PVC). In other embodiments the polymer material includes polypropylene, polyethylene, acrylonitrile styrene acrylate (ASA), polyurethane, or acrylonitrile butadiene styrene (ABS). Still, in other embodiments, the outer shell is formed of another material, such as metal, cement or natural products like wood or bamboo.

In various embodiments, e.g., when the polymer material of the shell is polyvinyl chloride, the outer shell has a thickness of no more than 1.35 mm, e.g., no more than 1.3 mm. In various embodiments, the outer shell has a thickness of no more than 1.25 mm, e.g., no more than 1.2 mm. In various embodiments, the outer shell has a thickness of at least 0.75 mm, e.g., at least 0.8 mm. In various embodiments, the outer shell has a thickness of at least 0.9 mm, e.g., at least 1 mm. For example, in various embodiments, the outer shell has a thickness in the range of 0.75-1.35 mm, e.g., 0.75-1.3 mm, or 0.75-1.25 mm, or 0.75-1.2 mm, or 0.8-1.35 mm, or 0.8-1.3 mm, or 0.8-1.25 mm, or 0.8-1.2 mm, or 0.9-1.35 mm, or 0.9-1.3 mm, or 0.9-1.25 mm, or 0.9-1.2 mm, or 1-1.35 mm, or 1-1.3 mm, or 1-1.25 mm, or 1-1.2 mm.

In various embodiments of the method as otherwise described herein, the foam is a rigid foam. Rigid foams, as would be understood by those of ordinary skill in the art hold their shape and resist compression. Accordingly, the rigid foam backing helps support the outer shell of the building surface panel and prevents sagging or bending of the outer shell across long spans of the building surface panel. In some embodiments, the foam is expanded polystyrene (EPS). In other embodiments, the foam is extruded polystyrene or polyisocyanurate. In various embodiments, the foam may include other components, such as additives and fillers as would be understood by those of ordinary skill in the art.

In various embodiments of the method as otherwise described herein, a blowing agent diffuses out of the foam piece during the aging of the foam piece. During the formation of the body of foam, a blowing agent is used to expand the foam material. After the body of foam is formed, the blowing agent begins to diffuse out of the foam material. In some embodiments, the foam piece is cut from the body of foam while substantial quantities of blowing agent remain in the body of foam. Accordingly, after the foam piece is cut from the body of foam, at least a portion of the blowing agent remaining in the foam piece diffuses out of the foam piece during the aging process. The smaller size of the cut foam pieces provides a shorter distance for the blowing agent to diffuse out of the foam compared to the larger body of foam, which accelerates the shrinking of the foam. Likewise, each cut foam piece has a larger surface area per volume of material compared to the body of foam, which can also promote diffusion of the blowing agent from the foam piece.

In various embodiments of the method as otherwise described herein, the blowing agent is pentane. In other embodiments, the blowing agent is an hydrofluoroolefin (HFO) or hydrochlorofluoroolefin (HCFO). Still in other embodiments, the blowing agent is another substance, such as hexane or dichloroethane. Various other volatile organic compounds can be used as blowing agents.

In various embodiments of the method as otherwise described herein, a length of the foam piece shrinks during the aging. For example, in some embodiments, as a blowing agent diffuses out of the foam piece the volume of the foam reduces. This reduction in the foam volume results in the foam piece shrinking in all directions, including the length, width and thickness. Because the size of the foam piece is greatest along the length, in some embodiments the shrinking of the foam piece results in size reduction along the length that is most evident. In other embodiments, the foam piece may be anisotropic and shrink to a greater extent along one direction than the others.

In various embodiments of the method as otherwise described herein, the shrink of the length of the foam piece is at least 0.10%, e.g., at least 0.15%, or at least 0.20%. For example, in some embodiments, the aging process, as shown in FIG. 6B, is continued for a sufficient duration to allow the foam piece to shrink at least 0.10% along its length. The duration of the aging process may be predetermined based on the dimensions of the foam piece, the age of the body of foam, and the environmental conditions in which the aging process is conducted, as explained in more detail below.

In various embodiments of the method as otherwise described herein, the foam piece is contained in an enclosed space during the aging process. For example, as shown in FIG. 6B, foam piece 630 is aged in an enclosure 640 where environmental conditions such as temperature, humidity, and air circulation are controlled. For example, the enclosure 640 may be a drying chamber or an oven. In other embodiments, the aging process is carried out in an open area, for example in an open section of a manufacturing facility.

In various embodiments of the method as otherwise described herein, air is circulated through the enclosed space. For example, in some embodiments air circulation equipment, such as blowers or fans, are used to cycle air through the enclosed space. For example, in some embodiments a volume of air equal to the volume of the enclosed space is removed from the enclosed space at least once per hour, e.g., at least twice per hour, e.g., at least four times per hour.

In various embodiments of the method as otherwise described herein, the foam piece is positioned on a support surface during the aging process and a surface of the foam piece that is opposite the support surface is exposed. The term exposed, as used herein means entirely exposed such that surface opposite the support surface is entirely uncovered. Thus, the foam piece is not covered during the aging process, neither by another foam piece nor by any packaging material.

In various embodiments of the method as otherwise described herein, the support surface is an air permeable surface. For example, in some embodiments, the foam piece is supported by an open rack that allows air to circulate around the foam piece. The exposure of both the sides of the foam piece during the aging process may, for example, allow blowing agent to diffuse from all exterior surfaces of the foam piece, which can accelerate any shrinking that occurs during the aging process.

In various embodiments of the method as otherwise described herein, the foam piece is aged in an enclosed space with a plurality of other foam pieces. For example, in some embodiments, a plurality of foam pieces are cut from the body of foam during a cutting operation, and the plurality of foam pieces are aged together. For example, in some embodiments, the plurality of foam pieces are stored on racks or shelves in the same enclosed space, such as an enclosure or chamber. In some embodiments, the foam pieces are stationary during the aging process. In other embodiments, the foam pieces are moved continuously during the aging process, for example, along a conveyor.

In various embodiments of the method as otherwise described herein, a first surface of the foam piece is separated from the other foam pieces by at least ½ inch during the aging process. For example, in some embodiments, a front surface of the foam piece is spaced apart from other foam pieces by at least % inch. Such an embodiment may include the foam piece resting on a shelf or rack with the front surface of the foam piece facing upward and a neighboring shelf or rack above the foam piece being positioned at least one inch from the front surface. In some embodiments, these separations of the foam pieces are accomplished by using spacers to create a gap of at least one half an inch between adjacent pieces of foam. Such spacers could be made of various materials, including scrap pieces of previously aged foam, wood, metal, plastic, etc. Further, in some embodiments, each surface of the foam piece is separated from any neighboring foam piece by at least ½ inch. For example, foam pieces that are stored on racks or shelves during the aging process may be spaced apart from other foam pieces on the same rack or shelf.

In various embodiments of the method as otherwise described herein, each of the other foam pieces have an identical configuration as the foam piece. For example, in some embodiments a plurality of identical foam pieces are cut from the body of foam and aged together during a manufacturing procedure for forming a plurality of identical building surface panels.

In various embodiments of the method as otherwise described herein, attaching the foam piece to the outer shell includes providing an adhesive between the foam piece and the outer shell. For example, in some embodiments adhesive is applied to one or both of the foam piece and the outer shell. For example, in the method shown in FIGS. 6A-6D, an adhesive 644 is sprayed across the front surface 636 of the foam piece 630 using an adhesive applicator 646, as shown in FIG. 6C. The foam piece 630 and outer shell 610 are then joined under pressure to bond the foam piece to the outer shell using the adhesive 644, as shown in FIG. 6D.

A building surface panel formed by the method of FIGS. 6A-6D is shown in perspective view in FIG. 6E. Building surface panel 600 includes an outer shell 610 and a foam backing 634 formed by the foam piece 630 shown in FIGS. 6B-6D. The building surface panel 600 extends along a length 602 from a first end to a second end and has a width 604 from a top of the fastening strip 624 of the outer shell 610 to the bottom of the outer shell 610 at the lower lock 628. Likewise, building surface panel 600 has a thickness 608 that is defined by both the foam backing 634 and outer shell 610 and is a measure of the distance that the building surface extends outward from a mounting surface on the rear side of the building surface panel 600.

In various embodiments as otherwise described herein, the foam piece is provided by cutting the foam piece from a body of foam, e.g., as in the embodiment described with respect to FIGS. 6A-6E. The present inventors have found that shrinkage is an especial problem with foam pieces cut from larger bodies of foam—even bodies of foam that themselves are aged for some time, as large bodies of foam are very slow to shrink through diffusion of blowing agent.

In various embodiments of the method as otherwise described herein, the method further includes aging the body of foam for at least 48 hours before cutting the foam piece out of the body of foam. Thus, in some embodiments, the foam is aged twice. First, the foam is aged after its initial formation, while it is still part of the body of foam. Subsequently, the foam is aged again after it is cut into the foam piece.

Nonetheless, the present inventors contemplate that the foam pieces may be provided in other manners. For example, in various alternative embodiments, a foam piece is provided by foam molding. It can be desirable to age a molded foam piece for sufficient time after molding to reduce the amount of residual shrinkage before attachment to an outer shell. In other alternative embodiments, a foam piece is provided by extrusion. Here, too, it can be desirable to age an extruded foam piece for sufficient time after molding to reduce the amount of residual shrinkage before attachment to an outer shell.

In various embodiments of the method as otherwise described herein, cutting the foam piece from the body of foam includes providing a contoured profile in the foam piece that corresponds to a shape of the outer shell. For example, as shown in FIG. 6B, the foam piece 630 that is cut from body of foam 632 includes a contoured profile on the front surface 636 of the foam piece that matches the contour of a portion of the rear side 614 of the outer shell 610 (see FIG. 6D). In particular, the contoured profile on the front surface 636 is configured to fit against a portion of the rear side 614 of outer shell 610 when the foam piece 630 is attached to the outer shell 610. The term contoured profile refers to a shape that includes at least one angled or curved surface. Thus, the including a foam piece having a contoured profile excludes a rectangular cross-sectional shape.

Figure 7A:
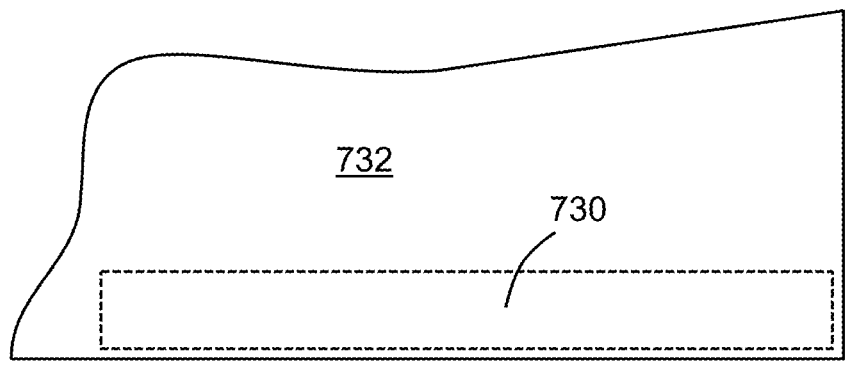
FIGS. 7A-7E are schematic side views showing parts of a method according to another embodiment of the disclosure.
Figure 7B:
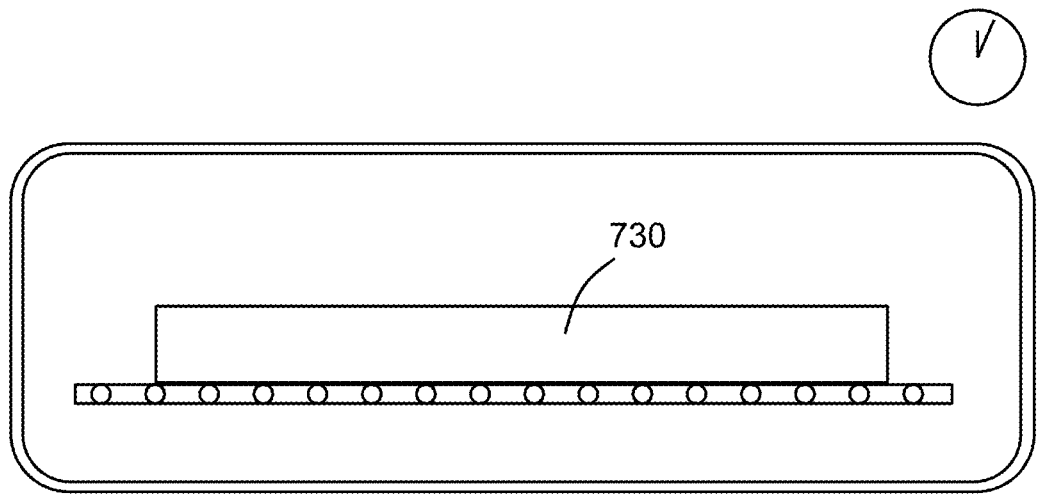
Figure 7C:
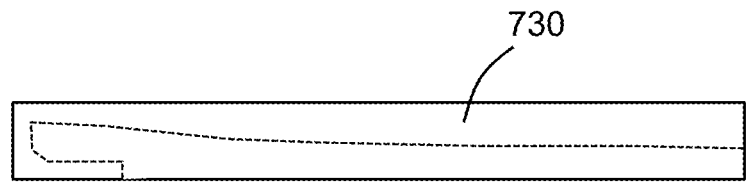
Figure 7D:
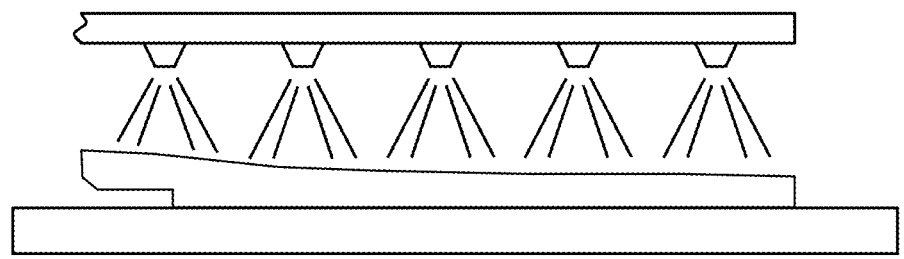
Figure 7E:
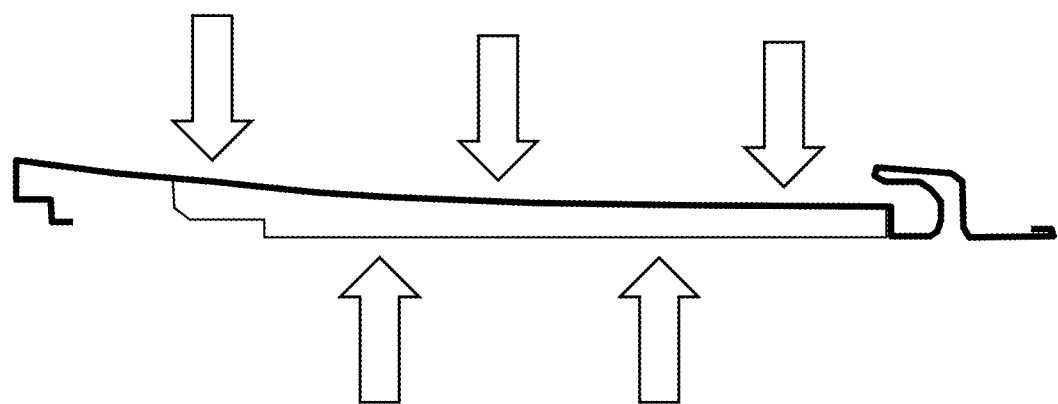

In various embodiments of the method as otherwise described herein, the method further includes shaping the foam piece (e.g., an aged foam piece) so as to include a contoured profile in the foam piece that corresponds to a shape of the outer shell. Thus, in some embodiments, the foam piece is cut from the body of foam, aged, and then the aged foam piece is shaped to include a contoured profile. Such a method is shown in FIGS. 7A-7E, which includes initially cutting a foam piece 730 from a body of foam 732 as illustrated by FIG. 7A, aging the foam piece as depicted in FIG. 7B, and then shaping the foam piece as illustrated in FIG. 7C. The method also includes adhering an outer shell 710 to the foam piece 730, as shown in FIGS. 7D and 7E.

In various embodiments of the method as otherwise described herein, shaping the foam piece includes removing material to provide the contoured profile. For example, as shown in FIGS. 7A-7C, in some embodiments the foam piece that is cut from the body of foam or otherwise formed has a simple cross-sectional shape, such as a rectangle. The foam piece is then aged, and the aged piece is shaped by removing additional material, for example by further cutting of the foam. In some embodiments, no more than 50% of the volume of the foam piece is removed to provide the contoured profile, e.g., no more than 40%, e.g., no more than 30%. In other embodiments, a larger volume of foam may be removed from the foam piece to shape the foam piece. For example, in some embodiments, shaping the foam piece involves removing segments of foam that may be used for other parts. For example, in some embodiments a foam piece is cut from the body of foam with sufficient volume to form the foam backing for several panels. This foam piece is aged and then shaped by cutting off a large section of foam to be used as the foam backing for other panels and also cutting the remaining foam to include a contoured profile.

It can be desirable for the foam piece to have at least one relatively short dimension, so that blowing agent has a relatively short path of diffusion from the foam piece. For example, in various embodiments as otherwise described herein, the provided foam piece has a shortest dimension of no more than 4 inches, e.g., no more than 3 inches. In various embodiments as otherwise described herein, the provided foam piece has a shortest dimension of no more than 2 inches, e.g., no more than 1.5 inches or no more than 1 inch. For example, a foam piece can be provided (e.g., cut from a larger body of foam) in sheet form with a thickness no greater than two inches, aged, then sectioned into multiple pieces that can each form a foam backing of a building panel.

In another aspect, the disclosure provides a building surface panel that includes an outer shell having a front side and a rear side, and a foam piece having a front surface and a rear surface. The front surface of the foam piece is attached to the rear side of outer shell along a length of the building surface panel so as to form a layered structure that extends along the length of the building surface panel. The building surface panel exhibits a deflection measurement of no more than 0.4 inches when subjected to the above-described curvature test.

Figure 8:
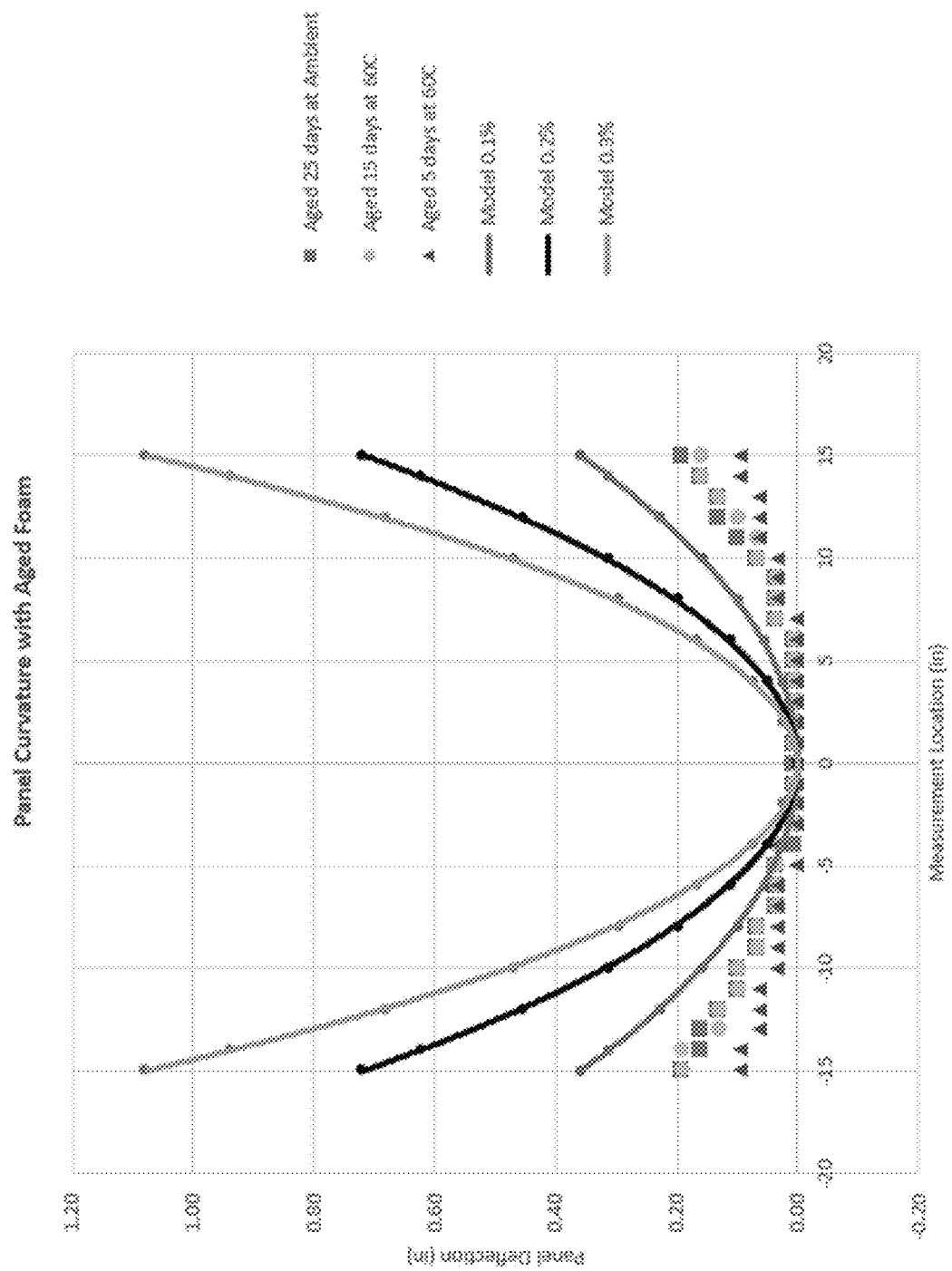
FIG. 8 shows the deflection across strips according to an embodiment of the disclosure.

FIG. 8 shows the results of the foregoing curvature test for three building surface panels according to the disclosure. In particular, FIG. 8 shows deflection measurements of three sample cut strips taken from building surface panels, including cut strip with foam pieces that were aged for (i) 25 days at ambient temperature, (ii) 15 days at 60° C., and (iii) 5 days at 60° C. Again, the first and second end points of the cut strip samples are respectively identified at −15 and 15 inches with the peak of each cut strip positioned at 0 inches. Further, the first and second end points are each located 1.5 inches from the respective ends of the 33-inch cut strip. The data in FIG. 8 show that the deflection measurement of the three building surface panels according to the disclosure are all below 0.4 inches and fall in a range from about 0.1 inches to 0.2 inches. Similar to FIG. 5B, FIG. 8 also shows data from models of three strips of a layered structure representative of a building surface panel. Again, the data for the models was computed using a finite element analysis tool. The models are represented by solid lines and depict calculated deflection points for cut strips where the foam backing shrinks by 0.1, 0.2 and 0.3 percent, respectively, where the 0.1 percentage of shrink corresponds to the lowest deflection measurements and the 0.3 percentage of shrink corresponds to the highest deflection measurements.

In some embodiments, the building surface panel exhibits a deflection measurement of less than 0.4 inches when subjected to the curvature test. For example, in some embodiments, the building surface panel exhibits a deflection measurement of no more than 0.3 inches when subjected to the curvature test, e.g., no more than 0.2 inches.

In some embodiments, the foam backing of the cut strip has an average thickness of at least ⅛ inch, e.g., an average thickness of at least ¼ inch. In some embodiments, the foam backing has a uniform thickness over the width of the building surface panel. In other embodiments, the foam backing varies in thickness as a result of the contoured profile on the front surface of the foam backing.

It is the understanding of the present inventors that cut strips exhibit similar curvature over a range of different widths, because the curvature is dependent upon the shrink of the foam backing along the length of the cut strip. Accordingly, in another aspect, the disclosure provides a building surface panel that includes an outer shell having a front side and a rear side, and an foam piece having a front surface and a rear surface. The front surface of the foam piece is attached to the rear side of outer shell along a length of the building surface panel so as to form a layered structure that extends along the length of the building surface panel. Further, the building surface panel exhibits a deflection measurement of no more than 0.4 inches when subjected to a curvature test using a cut strip having a width of 3 inches, but otherwise identical to the curvature test set forth above.

In various embodiments the building surface panel is a siding panel, such as building surface panel 600, described above. Further, in some embodiments, the outer shell is formed of a polymer material, such as PVC. As described above, the polymer material may also include polypropylene, polyethylene, acrylonitrile styrene acrylate (ASA), polyurethane, or acrylonitrile butadiene styrene (ABS). Alternatively, in other embodiments, the outer shell is formed of another material, such as metal, cement or natural products like wood or bamboo. In various embodiments the foam is a rigid foam, such as expanded polystyrene (EPS), extruded polystyrene, or polyisocyanurate, as also set forth above. Further, in some embodiments, the outer shell is formed of more than one material. For example, in some embodiments, the outer shell is formed of two layers of material that are coextruded or bonded together.

In various embodiments, the building surface panel is formed by the method of the disclosure. In other embodiments, the building surface panel is formed by another method. Likewise, in various embodiments, the building surface panel of the method of the disclosure meets the parameters of the curvature test set forth above. In other embodiments, the building surface panel of the method cannot satisfy the requirements of the curvature test. For example, in some embodiments the building surface panel formed in the method of the disclosure does not include a substantially flat section as needed to perform the test. Embodiments of the building surface panel of the disclosure that meets the curvature test set forth herein and embodiments of the building surface panel formed during the method of the disclosure may include various features as forth in more detail below.

In various embodiments as otherwise described herein, the outer shell is in the form of a siding panel and includes a fastening strip, an upper lock, a panel body, and a lower lock. For example, building surface panel 600 is a siding panel that includes a panel body 622 that forms the visible surface of the panel. At the top and bottom of the panel body 622 are an upper lock 626 and a lower lock 628 that are configured to secure the panel to neighboring panels of a similar configuration. Further, building surface panel 600 also includes a fastening strip 624 disposed at the top of the panel. The fastening stirp 624 forms a mounting surface of the panel that is configured to be held against an exterior wall. Further, the fastening strip 624 is configured to receive mechanical fasteners to secure the panel to the exterior wall.

In various embodiments as otherwise described herein, the panel body has a uniform cross-sectional shape along its length. For example, panel body 622 of building surface panel 600 has a slightly angled and curved profile over the width of the panel. This profile is uniform along the length of building surface panel 600 such that the panel body has the appearance of a long plank. In some embodiments, the upper lock and lower lock also have a substantially uniform cross-sectional shape along a length of the panel. In other embodiments, the parts of the outer shell vary along the length of the panel. For example, in some embodiments, the panel body has a textured appearance and is undulating along the length of the panel. Further, in some embodiments, the locks include features along the length of the panel, for example to aid in connection between neighboring panels, that may vary the cross-sectional shape of locks along the length of the panel. Likewise, the fastening strip may include tabs or other features that vary the cross-sectional shape of the fastening strip along the length of the panel.

In various embodiments as otherwise described herein, the foam piece is attached to the panel body of the outer shell. For example, foam backing 634 of building surface panel 600 is secured to the portion of outer shell 610 that forms the panel body 622. The top of foam backing 634 extends up to the upper lock 626 but the bottom of foam backing 634 is spaced from lower lock 628 to provide space for the upper lock of a neighboring panel that may be attached to lower lock 628.

In various embodiments as otherwise described herein, the foam piece has a uniform cross section along its length. For example, foam piece 630 used in the method of FIGS. 6A-6D has a uniform cross section along its length that matches the contour of the panel body 622 of outer shell 610. The uniform cross section of the foam piece allows three dimensional shaping of the foam piece to be avoided, such that the entire profile may be cut in a single operation, for example using a hot wire cutting method.

In various embodiments as otherwise described herein, the building surface panel has a length of at least 4 feet, e.g., at least 6 feet, e.g., at least 8 feet. In some embodiments, the building surface panel has a length of no more than 50 feet, e.g., no more than 40 feet, e.g., no more than 30 feet. For example, in some embodiments, the building surface panel has a length in a range from 4 feet to 50 feet, e.g., from 6 feet to 40 feet, e.g., from 8 feet to 30 feet. Still other embodiments of the building surface panel are longer or shorter.

In various embodiments as otherwise described herein, the building surface panel has a width of at least 4 inches, e.g., at least 6 inches. In some embodiments, the building surface panel has a width of no more than 24 inches, e.g., no more than 18 inches. For example, in some embodiments, the building surface panel has a width in a range from 4 inches to 24 inches, e.g., from 6 inches to 18 inches. The term width, as used herein, refers to the dimension from the top of the outer shell to the bottom of the outer shell. For example, as shown in FIG. 6E, the width of building surface panel 600 extends from the top of fastening strip 624 to the bottom of lower lock 628.

In various embodiments as otherwise described herein, the building surface panel has a thickness of at least % inch, e.g., at least % inch. In some embodiments, the building surface panel has a thickness of no more than 4 inches, e.g., no more than 3 inches. For example, in some embodiments, the building surface panel has a thickness in a range from % inch to 4 inches, e.g., from % inch to 3 inches. The term thickness, as described herein, is the extent that the building surface panel extends outward from a plane formed by the attachment surface on the rear side of the building surface panel, which is defined, for example, by the fastening strip or the rear surface of the foam backing.

In various embodiments as otherwise described herein, the attached foam piece has a thickness of an overall thickness of at least 1/8 inch, e.g., at least % inch. In some embodiments, the attached foam piece has a thickness of no more than 4 inches, e.g., no more than 3 inches. In some embodiments, the attached foam piece has a thickness of no more than 2 inches, e.g., no more than 1.5 inches, or no more than 1 inch. For example, in some embodiments, the attached foam piece has a thickness in a range from 1/8 inch to 4 inches, e.g., from % inch to 3 inches, or from 1/5 inch to 2 inches, or from 1/4 inch to 1.5 inches, or from 1/8 inch to 1 inch.

In various embodiments as otherwise described herein, the attached foam piece is set back from a first end of the outer shell in a range of 0.25 inches to 6 inches, e.g., 0.5 inches to 3 inches. For example, the foam backing 634 of building surface panel 600 is spaced from one end of outer shell 610 in order to form an overlapping section 616 that is configured to overlap a neighboring panel so as to form an overlapping joint between the two panels. In some embodiments, the overlapping section includes notches at the upper and lower sides of the building surface panel where the fastening strip, upper lock and lower lock are removed. In some embodiments, the opposing end of the foam backing is substantially flush with the end of the outer shell. Further, in other embodiments, the foam backing and outer shell are substantially flush at both ends of the building surface panel.

In a set of experiments, blocks of polystyrene foam expanded with pentane were stored for a minimum of 48 hours in ambient conditions. They were then cut into specifically designed foam pieces of approximately 3 inches shorter than the length of the panels to be made. Some foam pieces were attached to a rear side of an outer PVC shell on the same day that they were cut; 29 of these panels were measured for deflection. Other foam pieces were aged under certain conditions before being attached to a rear side of an outer shell. Measured were: ten pieces aged for 21 days under ambient conditions; five pieces aged for 25 days at ambient conditions; five pieces aged for 30 days at ambient conditions; and twenty-nine pieces aged for five days in a hot room at an average temperature of approximately 60° C.

Figure 9:
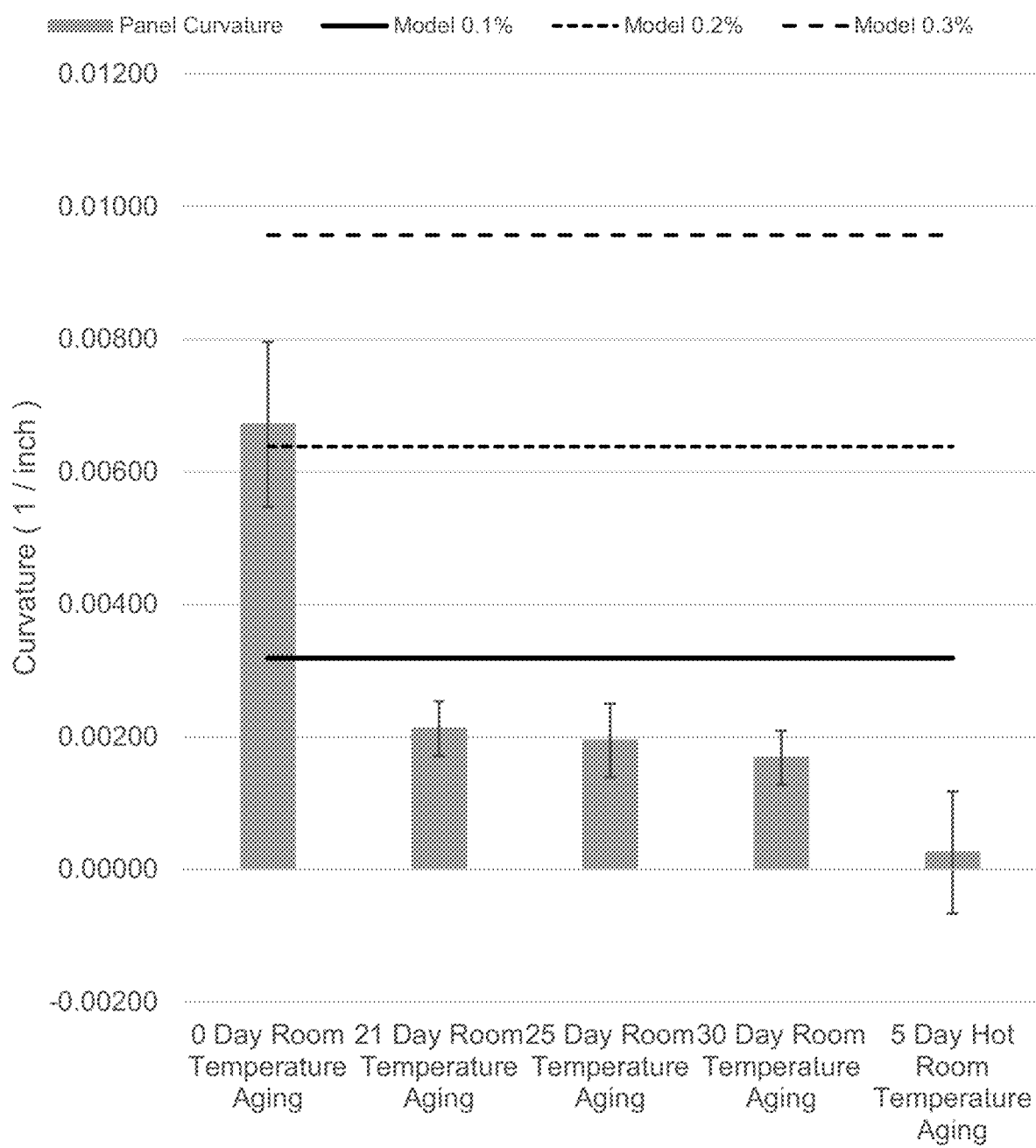
FIG. 9 is a graph showing average values and standard deviations for panel curvature for five types of experimental panels.
Figure 10:
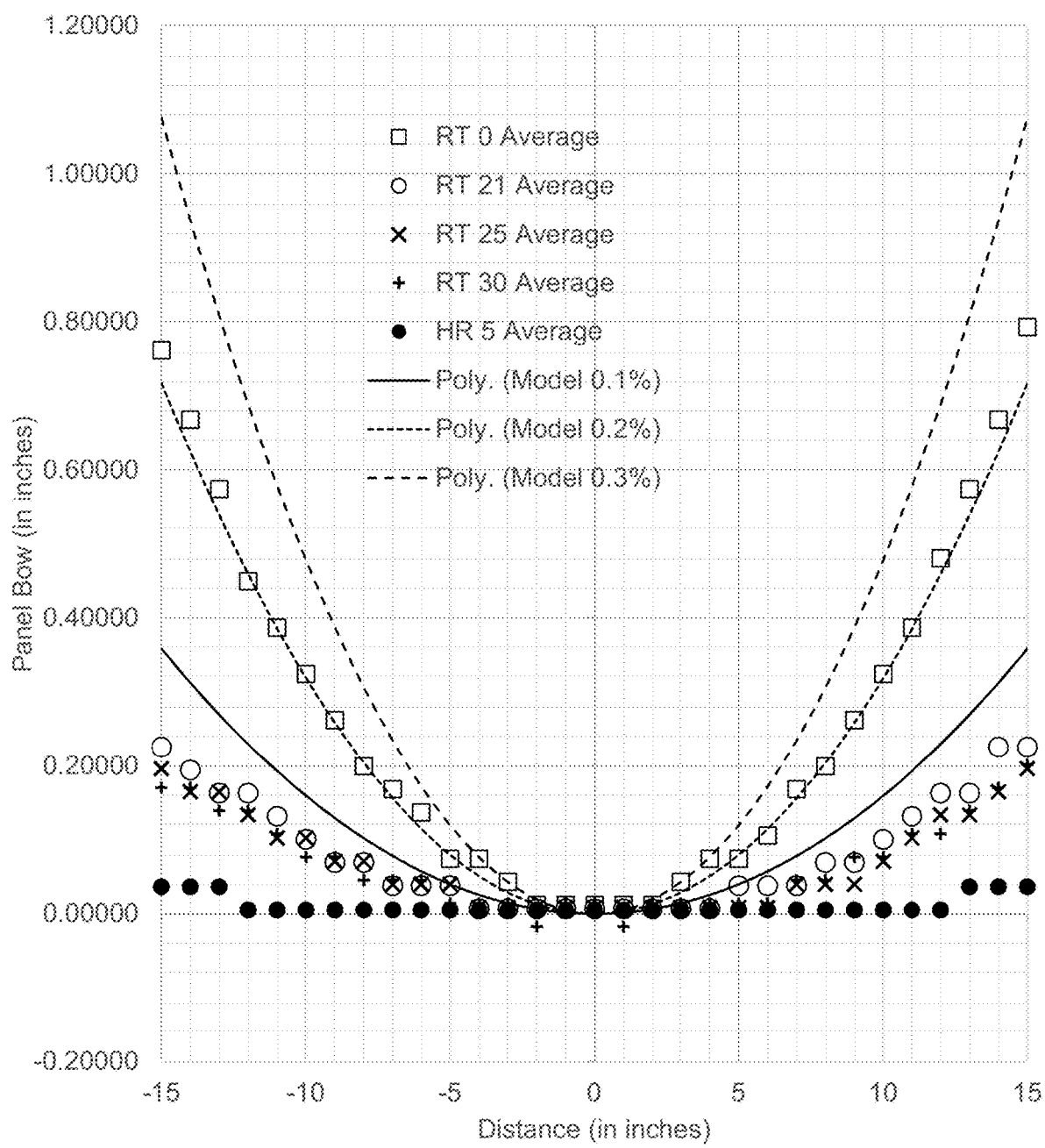
FIG. 10 is a graph showing average measured deflection values for the five types of experimental panels.

FIG. 9 is a graph showing average values and standard deviations for panel curvature for the five types of panel made in this set of experiments. Also provided are lines showing modeled curvatures for foam shrinkages of 0.1%, 0.2% and 0.3% after being attached to the outer shell. FIG. 10 shows averaged measured deflection for these samples. Notably, each of the ambient temperature aged sets demonstrated improved results as compared to the unaged set. And the set of samples aged for shorter time at higher temperature exhibited greatly improved results over even the ambient temperature aged sets.

Various aspects of the disclosure are further described by the following enumerated embodiments, which can be combined in any number and in any combination not technically or logically inconsistent.

Embodiment 1. A method of manufacturing a building surface panel, the method comprising:
   providing a foam piece having a 30 day/23° C. residual shrinkage of no more than 0.2%; and
   attaching the foam piece having the 30 day/23° C. residual shrinkage of no more than 0.2% to a rear side of an outer shell so as to form the building surface panel, e.g., wherein a front side of the outer shell forms a visible surface of the building surface panel.

Embodiment 2. The method according to Embodiment 1, wherein the 30 day/23° C. residual shrinkage of the foam piece is no more than 0.15%, e.g., no more than 0.1%.

Embodiment 3. The method according to Embodiment 1, wherein the 30 day/23° C. residual shrinkage of the foam piece is no more than 0.05%, e.g., no more than 0.03%, or no more than 0.02%.

Embodiment 4. The method according to any of Embodiments 1-3, wherein the foam piece is provided by aging the foam piece for a time and temperature such that the 30 day/23° C. residual shrinkage is no more than 0.2%, e.g., no more than 0.15%, or no more than 0.1%, or no more than 0.05%, or no more than 0.03%, or no more than 0.02%.

Embodiment 5. The method according to any of Embodiments 1-4, wherein a 150 day/23° C. residual shrinkage of the foam piece is no more than 0.25%.

Embodiment 6. A method of manufacturing a building surface panel, the method comprising:
   providing a foam piece having a 150 day/23° C. residual shrinkage of no more than 0.25%; and
   attaching the foam piece having the 150 day/23° C. residual shrinkage of no more than 0.25% to a rear side of an outer shell so as to form the building surface panel, e.g., wherein a front side of the outer shell forms a visible surface of the building surface panel.

Embodiment 7. The method according to any of Embodiments 1-6, wherein a 150 day/23° C. residual shrinkage of the foam piece is no more than 0.20%, e.g., no more than 0.15%.

Embodiment 8. The method according to any of Embodiments 1-6, wherein a 150 day/23° C. residual shrinkage of the foam piece is no more than 0.10%, e.g., no more than 0.05%.

Embodiment 9. The method according to any of Embodiments 1-8, wherein the foam piece is provided by aging the foam piece for a time and temperature such that the 150 day/23° C. residual shrinkage is no more than 0.25%, e.g., no more than 0.20%, or no more than 0.15%, or no more than 0.10%, or no more than 0.05%.

Embodiment 10. The method according to Embodiment 4 or Embodiment 9, wherein a ratio of the shrinkage during the aging to a 30 day/23° C. initial shrinkage of the foam piece is at least 0.5.

Embodiment 11. The method of manufacturing a building surface panel, the method comprising:
providing a foam piece;
aging the foam piece for a time and at a temperature such that a ratio of the shrinkage during the aging to a 30 day/23° C. initial shrinkage of the foam piece is at least 0.5; and
attaching the aged foam piece to a rear side of an outer shell so as to form the building surface panel, e.g., wherein a front side of the outer shell forms a visible surface of the building surface panel.

Embodiment 12. The method according any of Embodiments 4 and 9-11, wherein the ratio of the shrinkage during the aging to a 30 day/23° C. initial shrinkage of the foam piece is at least 0.6, e.g., at least 0.7.

Embodiment 13. The method according to any of Embodiments 4 and 9-11, wherein the ratio of the shrinkage during the aging to a 30 day/23° C. initial shrinkage of the foam piece is at least 0.8, e.g., at least 0.85.

Embodiment 14. The method according to any of Embodiments 4 and 9-11, wherein the ratio of the shrinkage during the aging to a 30 day/23° C. initial shrinkage of the foam piece is at least 0.9, e.g., at least 0.95.

Embodiment 15. The method according to any of Embodiments 4 and 9-14, wherein a ratio of the shrinkage during the aging to a 150 day/23° C. initial shrinkage of the foam piece is at least 0.5.

Embodiment 16. The method of manufacturing a building surface panel, the method comprising:
providing a foam piece;
aging the foam piece for a time and at a temperature such that a ratio of the shrinkage during the aging to a 150 day/23° C. initial shrinkage of the foam piece is at least 0.5; and
attaching the aged foam piece to a rear side of an outer shell so as to form the building surface panel, e.g., wherein a front side of the outer shell forms a visible surface of the building surface panel.

Embodiment 17. The method according to Embodiment any of Embodiments 4 and 9-16, wherein the ratio of the shrinkage during the aging to a 150 day/23° C. initial shrinkage of the foam piece is at least 0.6, e.g., at least 0.7.

Embodiment 18. The method according to any of Embodiments 4 and 9-16, wherein the ratio of the shrinkage during the aging to a 150 day/23° C. initial shrinkage of the foam piece is at least 0.8, e.g., at least 0.85.

Embodiment 19. The method according to any of Embodiments 4 and 9-18, wherein the ratio of the shrinkage during the aging to a 150 day/23° C. initial shrinkage of the foam piece is at least 0.9, e.g., at least 0.95.

Embodiment 20. The method according to any of Embodiments 4 and 9-19, wherein the foam piece is aged for at least one day, e.g., at least two days.

Embodiment 21. The method according to any of Embodiments 4 and 9-19, wherein the foam piece is aged for at least three days.

Embodiment 22. A method of manufacturing a building surface panel, the method comprising:
providing a foam piece;
aging the foam piece for at least three days so as to form an aged foam piece; and
attaching the aged foam piece to a rear side of an outer shell so as to form the building surface panel, e.g., wherein a front side of the outer shell forms a visible surface of the building surface panel.

Embodiment 23. The method according to any of Embodiments 4 and 9-22, wherein the foam piece is aged for at least 5 days, e.g., at least 6 days.

Embodiment 24. The method according to any of Embodiments 4 and 9-22, wherein the foam piece is aged for at least 7 days, e.g., at least 10 days.

Embodiment 25. The method according to any of Embodiments 4 and 9-22, wherein the foam piece is aged for at least 15 days, e.g., at least 20 days.

Embodiment 26. The method according to any of Embodiments 4 and 9-25, wherein the foam piece is aged at a temperature of at least 35° C.

Embodiment 27. A method of manufacturing a building surface panel, the method comprising:
providing a foam piece:
aging the foam piece at a temperature of at least 35° C. so as to form an aged foam piece; and
attaching the aged foam piece to a rear side of an outer shell so as to form the building surface panel, e.g., wherein a front side of the outer shell forms a visible surface of the building surface panel.

Embodiment 28. A method according to any of Embodiments 4 and 9-27, wherein the foam piece is aged at a temperature of at least 40° C., e.g., at least 45° C.

Embodiment 29. A method according to any of Embodiments 4 and 9-27, wherein the foam piece is aged at a temperature of at least 50° C., e.g., at least 55° C., or at least 60° C.

Embodiment 30. The method according to any of Embodiments 4 and 9-29, wherein a temperature during aging remains no more than a value that is 20° C. less than a glass transition temperature of the foam of the foam piece.

Embodiment 31. The method according to any of Embodiments 4 and 9-30, wherein a temperature during aging remains no more than a Heat Distortion Temperature of the foam of the foam piece, e.g., at least 10° C. less than or at least 20° C. less than a Heat Distortion Temperature of the foam of the foam piece, measured as in ASTM D648.

Embodiment 32. The method according to any of Embodiments 4 and 9-31, wherein the foam piece is aged at a pressure of no more than 0.85 atmospheres.

Embodiment 33. A method of manufacturing a building surface panel, the method comprising:
providing a foam piece:
aging the foam piece at a pressure of no more than 0.85 atmospheres so as to form an aged foam piece; and
attaching the aged foam piece to a rear side of an outer shell so as to form the building surface panel, e.g., wherein a front side of the outer shell forms a visible surface of the building surface panel.

Embodiment 34. A method according to any of Embodiments 4 and 9-33, wherein the foam piece is aged at a pressure of no more than 0.8 atmospheres, e.g., no more than 0.7 atmospheres.

Embodiment 35. A method according to any of Embodiments 4 and 9-33, wherein the foam piece is aged at a pressure of no more than 0.6 atmospheres, e.g., no more than 0.5 atmospheres.

Embodiment 36. The method according to any of Embodiments 1-35, wherein the building surface panel is a siding panel.

Embodiment 37. The method according to any of Embodiments 1-36, wherein the outer shell is formed of a polymer material.

Embodiment 38. The method according to Embodiment 37, wherein the polymer material includes polyvinyl chloride.

Embodiment 39. The method according to any of Embodiments 1-38, wherein the outer shell has a thickness of no more than 1.35 mm, e.g., no more than 1.3 mm.

Embodiment 40. The method according to any of Embodiments 1-38, wherein the outer shell has a thickness of no more than 1.25 mm, e.g., no more than 1.25 mm.

Embodiment 41. The method according to any of Embodiments 1-40, wherein the outer shell has a thickness of at least 0.75 mm, e.g., at least 0.8 mm.

Embodiment 42. The method according to any of Embodiments 1-40, wherein the outer shell has a thickness of at least 0.9 mm, e.g., at least 1 mm.

Embodiment 43. The method according to any of Embodiments 1-38, wherein the outer shell has a thickness in the range of 0.75-1.35 mm, e.g., 0.75-1.3 mm, or 0.75-1.25 mm, or 0.75-1.2 mm, or 0.8-1.35 mm, or 0.8-1.3 mm, or 0.8-1.25 mm, or 0.8-1.2 mm, or 0.9-1.35 mm, or 0.9-1.3 mm, or 0.9-1.25 mm, or 0.9-1.2 mm, or 1-1.35 mm, or 1-1.3 mm, or 1-1.25 mm, or 1-1.2 mm.

Embodiment 44. The method according to any of Embodiments 1-43, wherein the foam is a rigid foam.

Embodiment 45. The method according to any of Embodiments 1-44, wherein the foam is expanded polystyrene (EPS).

Embodiment 46. The method according to any of Embodiments 4 and 9-45, wherein a blowing agent diffuses out of the foam piece during the aging of the foam piece.

Embodiment 47. The method according to Embodiment 46, wherein the blowing agent is a volatile organic compound.

Embodiment 48. The method according to Embodiment 46, wherein the blowing agent is pentane.

Embodiment 49. The method according to any of Embodiments 4 and 9-48, wherein a length of the foam piece shrinks during the aging by at least 0.10%, e.g., at least 0.15%, or at least 0.20%.

Embodiment 50. The method according to any of Embodiments 4 and 9-49, wherein the foam piece is contained in an enclosed space during the aging.

Embodiment 51. The method according to Embodiment 50, wherein air is circulated through the enclosed space.

Embodiment 52. The method according to any of Embodiments 4 and 9-49, wherein the foam piece is heated during the aging process Embodiment 53. The method according to any of Embodiments 4 and 9-49, wherein the foam piece is positioned on a support surface during the aging and wherein a surface of the foam piece that is opposite the support surface is exposed.

Embodiment 54. The method according to Embodiment 53, wherein the support surface is an air permeable surface.

Embodiment 55. The method according to any of Embodiments 4 and 9-49, wherein the foam piece is aged in an enclosed space with a plurality of other foam pieces during the aging.

Embodiment 56. The method according to Embodiment 55, wherein a first surface of the foam piece is separated from the other foam pieces by at least one inch during the aging.

Embodiment 57. The method according to Embodiment 55 or Embodiment 56, wherein each of the other foam pieces have an identical configuration as the foam piece.

Embodiment 58. The method according to any of Embodiments 1-57, wherein attaching the foam piece to the outer shell includes providing an adhesive between the foam piece and the outer shell.

Embodiment 59. The method according to any of Embodiments 1-58, wherein the foam piece is provided by cutting the foam piece from a body of foam.

Embodiment 60. The method according to Embodiment 59, wherein cutting the foam piece from the body of foam includes providing a contoured profile in the foam piece that corresponds to a shape of the outer shell.

Embodiment 61. The method according to Embodiment 59 or Embodiment 60, further comprising aging the body of foam for at least 48 hours before cutting the foam piece out of the body of foam.

Embodiment 62. The method according to any of Embodiments 1-58, wherein the foam piece is provided by foam molding or by extrusion.

Embodiment 63. The method according to any of Embodiments 1-62, further comprising shaping the foam piece so as to include a contoured profile in the foam piece that corresponds to a shape of the outer shell.

Embodiment 64. The method according to Embodiment 63, wherein shaping the foam piece includes removing material to provide the contoured profile.

Embodiment 65. The method according to Embodiment 64, wherein no more than 50% of the volume of the foam piece is removed to provide the contoured profile, e.g., no more than 40%, e.g., no more than 30%.

Embodiment 66. The method according to any of Embodiments 1-65, wherein the foam piece has a shortest dimension of no more than four inches, e.g., no more than three inches.

Embodiment 67. The method according to any of Embodiments 1-65, wherein the foam piece has a shortest dimension of no more than two inches, e.g., no more than 1.5 inches or no more than 1 inch.

Embodiment 68. The method according to any of Embodiments 1-67, wherein the outer shell is formed of a bent sheet of material.

Embodiment 69. The method according to any of Embodiments 1-68, wherein the outer shell is in the form of a siding panel and includes a fastening strip, an upper lock, a panel body, and a lower lock.

Embodiment 70. The method according to any of Embodiments 1-69, wherein the panel body has a uniform cross-sectional shape along its length.

Embodiment 71. The method according to any of Embodiments 1-70, wherein the foam piece is attached to the panel body of the outer shell.

Embodiment 72. The method according to any of Embodiments 1-71, wherein the foam piece has a uniform cross section along its length.

Embodiment 73. The method according to any of Embodiments 1-72, wherein the building surface panel has a length of at least 4 feet, e.g., at least 6 feet, e.g., at least 8 feet.

Embodiment 74. The method according to any of Embodiments 1-73, wherein the building surface panel has a length of no more than 50 feet, e.g., no more than 40 feet, e.g., no more than 30 feet.

Embodiment 75. The method according to any of Embodiments 1-74, wherein the building surface panel has a width of at least 4 inches, e.g., at least 6 inches.

Embodiment 76. The method according to any of Embodiments 1-75, wherein the building surface panel has a width of no more than 24 inches, e.g., no more than 18 inches.

Embodiment 77. The method according to any of Embodiments 1-76, wherein the building surface panel has a thickness of at least % inch, e.g., at least % inch.

Embodiment 78. The method according to any of Embodiments 1-77, wherein the building surface panel has a thickness of no more than 4 inches, e.g., no more than 3 inches.

Embodiment 79. The method according to any of Embodiments 1-78, wherein the attached foam piece is set back from a first end of the outer shell in a range of 0.25 inches to 6 inches, e.g., 0.5 inches to 3 inches.

Embodiment 80. The method according to any of Embodiments 1-79, wherein the attached foam piece has a thickness of at least ⅛ inch, e.g., ¼ inch.

Embodiment 81. The method according to any of Embodiments 1-80, wherein the attached foam piece has a thickness of no more than 4 inches, e.g., no more than 3 inches.

Embodiment 82. The method according to any of Embodiments 1-80, wherein the attached foam piece has a thickness of no more than 2 inches, e.g., no more than 1.5 inches or nor more than 1 inch.

Embodiment 83. A building surface panel comprising:
an outer shell having a front side and a rear side; and
a foam piece including a front surface and a rear surface, the front surface of the foam piece being attached to the rear side of outer shell along a length of the building surface panel so as to form a layered structure that extends along the length of the building surface panel,
wherein the building surface panel exhibits a deflection measurement of no more than 0.4 inches if subjected to a curvature test, the curvature test comprising:
removing a substantially flat strip of the layered structure from the building surface panel, the strip extending parallel to the length of the building surface panel and having a length of 33 inches and a width of 4.5 inches,
defining a first end point of the strip at a position on the front side of the outer shell that is 1.5 inches from a first end of the strip and centered across the width of the strip, and defining a second end point of the strip at a position on the front side of the outer shell that is that is 1.5 inches from the second end of the strip and centered across the width of the strip,
positioning the strip such that the width is oriented vertically, the front side of the outer shell faces a fixed reference plane, and a line that passes through the first and second end points is parallel to the reference plane, and
measuring, using a laser position gage, the deflection measurement as equal to a difference between a first distance from the end points to the reference plane and a second distance from a peak on the front side of the outer shell to the reference plane.

Embodiment 84. A building surface panel comprising:
an outer shell having a front side and a rear side; and
a foam piece including a front surface and a rear surface, the front surface of the foam piece being attached to the rear side of outer shell along a length of the building surface panel so as to form a layered structure that extends along the length of the building surface panel,
wherein the building surface panel exhibits a deflection measurement of no more than 0.4 inches if subjected to a curvature test, the curvature test comprising:
removing a substantially flat strip of the layered structure from the building surface panel, the strip extending parallel to the length of the building surface panel and having a length of 33 inches and a width of 3 inches,
defining a first end point of the strip at a position on the front side of the outer shell that is 1.5 inches from a first end of the strip and centered across the width of the strip, and defining a second end point of the strip at a position on the front side of the outer shell that is that is 1.5 inches from the second end of the strip and centered across the width of the strip,
positioning the strip such that the width is oriented vertically, the front side of the outer shell faces a fixed reference plane, and a line that passes through the first and second end points is parallel to the reference plane, and
measuring, using a laser position gage, the deflection measurement as equal to a difference between a first distance from the end points to the reference plane and a second distance from a peak on the front side of the outer shell to the reference plane.

Embodiment 85. The building surface panel according to Embodiment 83 or Embodiment 84, wherein the building surface panel exhibits a deflection measurement of no more than 0.3 inches when subjected to the curvature test.

Embodiment 86. The building surface panel according to Embodiment 83 or Embodiment 84, wherein the building surface panel exhibits a deflection measurement of no more than 0.2 inches when subjected to the curvature test.

Embodiment 87. The building surface panel according to any of Embodiments 83-86, wherein the building surface panel is a siding panel.

Embodiment 88. The building surface pane according to any of Embodiments 83-87, wherein the outer shell is formed of a polymer material.

Embodiment 89. The building surface panel according to Embodiment 88, wherein the polymer material includes polyvinyl chloride.

Embodiment 90. The building surface panel according to any of Embodiments 83-89, wherein the outer shell has a thickness of no more than 1.35 mm, e.g., no more than 1.3 mm.

Embodiment 91. The building surface panel according to any of Embodiments 83-89, wherein the outer shell has a thickness of no more than 1.25 mm, e.g., no more than 1.25 mm.

Embodiment 92. The building surface panel according to any of Embodiments 83-91, wherein the outer shell has a thickness of at least 0.75 mm, e.g., at least 0.8 mm.

Embodiment 93. The building surface panel according to any of Embodiments 83-91, wherein the outer shell has a thickness of at least 0.9 mm, e.g., at least 1 mm.

Embodiment 94. The building surface panel according to any of Embodiments 83-93, wherein the outer shell has a thickness in the range of 0.75-1.35 mm, e.g., 0.75-1.3 mm, or 0.75-1.25 mm, or 0.75-1.2 mm, or 0.8-1.35 mm, or 0.8-1.3 mm, or 0.8-1.25 mm, or 0.8-1.2 mm, or 0.9-1.35 mm, or 0.9-1.3 mm, or 0.9-1.25 mm, or 0.9-1.2 mm, or 1-1.35 mm, or 1-1.3 mm, or 1-1.25 mm, or 1-1.2 mm.

Embodiment 95. The building surface panel according to any of Embodiments 83-94, wherein the foam is a rigid foam.

Embodiment 96. The building surface panel according to any of Embodiments 83-95, wherein the foam is EPS.

Embodiment 97. The building surface panel according to any of Embodiments 83-96, wherein an adhesive adheres the foam to the outer shell.

Embodiment 98. The building surface panel according to any of Embodiments 83-97, wherein the building surface panel includes any of the features of Embodiments 36-45 and 66-82.

Embodiment 99. The building surface panel according to any of Embodiments 83-98, wherein the building surface panel is formed by the method of any of Embodiments 1-65.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A method of manufacturing a building surface panel, the method comprising:
    providing a foam piece;
    aging the foam piece for at least 1 day or at a pressure of no more than 0.85 atmospheres so as to form an aged foam piece, wherein the aged foam piece has at least one of a 30 day/23° C. residual shrinkage of no more than 0.2% or a 150 day/23° C. residual shrinkage of no more than 0.25%; and
    attaching the aged foam piece to a rear side of an outer shell so as to form the building surface panel, wherein the building surface panel further comprises a fastening strip along a top of the building surface panel,
    wherein the outer shell comprises polyvinyl chloride.

2. The method according to claim 1, wherein the foam piece to be aged is provided by cutting the foam piece from a body of foam.

3. The method according to claim 1, wherein the aged foam piece having the 30 day/23° C. residual shrinkage of no more than 0.2% is provided by a method comprising:
    aging the foam piece such that a ratio of a shrinkage during the aging to a 30 day/23° C. initial shrinkage of the foam piece is at least 0.5.

4. The method according to claim 3, wherein a ratio of the shrinkage during the aging to a 150 day/23° C. initial shrinkage of the foam piece is at least 0.85.

5. The method according to claim 3, wherein the foam piece is aged for at least two days.

6. The method according to claim 1, wherein the foam piece having the 30 day/23° C. residual shrinkage of no more than 0.2% is provided by a method comprising:
    aging the foam piece for at least three days or at a temperature of at least 35° C., so as to form the aged foam piece having the 30 day/23° C. residual shrinkage of no more than 0.2%.

7. The method according to claim 1, wherein the foam is expanded polystyrene (EPS).

8. The method according to claim 1, wherein the building surface panel comprises:
    the outer shell having a front side and the rear side; and
    the foam piece including a front surface and a rear surface, the front surface of the foam piece being attached to the rear side of outer shell along a length of the building surface panel so as to form a layered structure that extends along the length of the building surface panel;
    wherein the building surface panel exhibits a deflection measurement of no more than 0.4 inches if subjected to a curvature test, the curvature test comprising:
        removing a substantially flat strip of the layered structure from the building surface panel, the strip extending parallel to the length of the building surface panel and having a length of 33 inches and a width of 4.5 inches,
        defining a first end point of the strip at a position on the front side of the outer shell that is 1.5 inches from a first end of the strip and centered across the width of the strip, and defining a second end point of the strip at a position on the front side of the outer shell that is that is 1.5 inches from the second end of the strip and centered across the width of the strip,
        positioning the strip such that the width is oriented vertically, the front side of the outer shell faces a fixed reference plane, and a line that passes through the first and second end points is parallel to the reference plane, and
        measuring, using a laser position gage, the deflection measurement as equal to a difference between a first distance from the end points to the reference plane and a second distance from a peak on the front side of the outer shell to the reference plane.

9. The method according to claim 8, wherein the building surface panel exhibits a deflection measurement of no more than 0.2 inches when subjected to the curvature test.

10. A method of manufacturing a building surface panel, the method comprising:
    cutting a foam piece from a body of foam;
    aging the foam piece to shrink the foam piece by at least 0.10% along its length, to form an aged foam piece;
    attaching the aged foam piece to a rear side of an outer shell so as to form the building surface panel, wherein the building surface panel further comprises a fastening strip along a top of the building surface panel,
    wherein the outer shell comprises polyvinyl chloride.

11. The method according to claim 10, wherein the method further comprises aging the body of foam before the step of cutting a foam piece from a body of foam.

12. The method according to claim 10, wherein aging the foam piece comprises aging for at least one day.

13. The method according to claim 10, wherein a temperature during aging is no more than a value that is 20° C. less than a glass transition temperature of the foam of the foam piece.

14. The method according to claim 10, wherein a temperature during aging is less than a Heat Distortion Temperature of the foam of the foam piece, measured as in ASTM D648.

15. The method according to claim 10, wherein aging the foam piece comprises aging at ambient temperature.

16. The method according to claim 10, wherein the aging is performed at an average temperature of at least 30° C.

17. The method according to claim 10, wherein aging the foam piece comprises aging at a temperature of at least 23° C.

18. The method according to claim 10, wherein aging the foam piece comprises aging at a pressure below atmospheric pressure.

19. The method according to claim 10, wherein the foam piece comprises polystyrene or polyisocyanurate.

20. The method according to claim 10, wherein the foam piece comprises expanded polystyrene.

21. The method according to claim 10, wherein the foam piece comprises expanded polystyrene and wherein the outer shell comprises polyvinyl chloride.

22. The method according to claim 10, wherein the body of foam is formed using a blowing agent.

23. The method according to claim 22, wherein the blowing agent comprises pentane, hexane, dichloroethane, a hydrofluoroolefin, a hydrochlorofluoroolefin, or a combination thereof.

24. The method according to claim 10, wherein attaching the aged foam piece to a rear side of an outer shell comprises applying an adhesive to one or both of a front face of the aged foam piece and the rear side of the outer shell.

25. The method according to claim 10, wherein the body of foam has a volume of at least 10 times that of the volume of the foam piece.

26. The method according to claim 10, further comprising providing a contoured profile on a front face of the aged foam piece that matches a contour of a portion of the rear side of the outer shell, either before or after aging to thereby provide the aged foam piece a contoured profile.

27. The method according to claim 10, wherein a shortest dimension of the foam piece is no more than 4 inches.

28. A method of manufacturing a building surface panel, the method comprising:
   providing a foam piece;
   aging the foam piece so as to form an aged foam piece, wherein the foam piece is either aged for at least 1 day or aged at a pressure below atmospheric pressure; and
   attaching the aged foam piece to a rear side of an outer shell so as to form the building surface panel wherein the building surface panel further comprises a fastening strip along a top of the building surface panel,
   wherein the outer shell comprises polyvinyl chloride
   wherein the wherein the building surface panel exhibits a deflection measurement of no more than 0.4 inches if subjected to a curvature test, the curvature test comprising:
      removing a substantially flat strip of the layered structure from the building surface panel, the strip extending parallel to the length of the building surface panel and having a length of 33 inches and a width of 4.5 inches,
      defining a first end point of the strip at a position on the front side of the outer shell that is 1.5 inches from a first end of the strip and centered across the width of the strip, and defining a second end point of the strip at a position on the front side of the outer shell that is that is 1.5 inches from the second end of the strip and centered across the width of the strip,
      positioning the strip such that the width is oriented vertically, the front side of the outer shell faces a fixed reference plane, and a line that passes through the first and second end points is parallel to the reference plane, and
   measuring, using a laser position gage, the deflection measurement as equal to a difference between a first distance from the end points to the reference plane and a second distance from a peak on the front side of the outer shell to the reference plane.

29. The method according to claim 28, wherein the aged foam piece has at least one of the following:
   (i) a 30 day/23° C. residual shrinkage of no more than 0.2%,
   (ii) a 150 day/23° C. residual shrinkage of no more than 0.25%,
   (iii) a ratio of a shrinkage during the aging to a 30 day/23° C. initial shrinkage of the foam piece is at least 0.5, and/or
   (iv) a ratio of the shrinkage during the aging to a 150 day/23° C. initial shrinkage of the foam piece is at least 0.85.

30. The method according to claim 28, wherein the building surface panel exhibits a deflection measurement of no more than 0.2 inches when subjected to the curvature test.

31. The method according to claim 28, wherein aging the foam piece comprises one of the following:
   (i) aging at ambient temperature,
   (ii) aging at an average temperature of at least 30° C.,
   (iii) aging at a temperature of at least 23° C., or
   (iv) aging at a pressure of no more than 0.85 atmospheres.

32. The method according to claim 28, wherein the foam piece comprises polystyrene or polyisocyanurate.

33. The method according to claim 28, wherein the foam piece comprises expanded polystyrene.

34. The method according to claim 28, wherein the body of foam is formed using a blowing agent.

35. The method according to claim 28, wherein the blowing agent comprises pentane, hexane, dichloroethane, a hydrofluoroolefin, a hydrochlorofluoroolefin, or a combination thereof.

36. The method according to claim 28, wherein attaching the aged foam piece to a rear side of an outer shell comprises applying an adhesive to one or both of a front face of the aged foam piece and the rear side of the outer shell.

37. The method according to claim 28, wherein the body of foam has a volume of at least 10 times that of the volume of the foam piece.

* * * * *